United States Patent [19]

Mathur et al.

[11] Patent Number: 5,025,365
[45] Date of Patent: Jun. 18, 1991

[54] HARDWARE IMPLEMENTED CACHE COHERENCY PROTOCOL WITH DUPLICATED DISTRIBUTED DIRECTORIES FOR HIGH-PERFORMANCE MULTIPROCESSORS

[75] Inventors: Sanjay S. Mathur, Mission Viejo; John S. Fernando, Los Angeles, both of Calif.

[73] Assignee: Unisys Corporation, Blue Bell, Pa.

[21] Appl. No.: 270,324

[22] Filed: Nov. 14, 1988

[51] Int. Cl.[5] .................. G06F 12/12; G06F 13/00
[52] U.S. Cl. ............................ 364/200; 364/243.4; 364/243.41
[58] Field of Search ... 364/200 MS File, 900 MS File

[56] References Cited

U.S. PATENT DOCUMENTS

| | | | |
|---|---|---|---|
| 3,845,474 | 10/1974 | Lange et al. | 364/200 |
| 3,967,247 | 6/1976 | Anderson et al. | 364/200 |
| 4,056,844 | 11/1977 | Izumi | 364/200 |
| 4,442,487 | 4/1984 | Fletcher et al. | 364/200 |
| 4,490,190 | 1/1985 | Peters | 364/200 |
| 4,755,930 | 7/1988 | Wilson et al. | 364/200 |
| 4,843,542 | 6/1989 | Dashiell et al. | 364/200 |
| 4,853,846 | 8/1989 | Johnson et al. | 364/200 |
| 4,860,192 | 8/1989 | Sachs | 364/200 |

FOREIGN PATENT DOCUMENTS 0165823 12/1985 European Pat. Off. .
0278196 8/1988 European Pat. Off. .

OTHER PUBLICATIONS

Censier, "A New Solution to Coherence Problems in Multi-Cache System", 12/12/78, IEEE Transactions on Computers, vol. C-27, pp. 1112-1118.

Primary Examiner—David Y. Eng
Attorney, Agent, or Firm—Alfred W. Kozak; Mark T. Starr

[57] ABSTRACT

This disclosure describes a snooping coherency protocol for a multiprocessor network wherein every processor has its own private cache and bus interface means and the network is connected via a common system bus. Each processor has its own cache directory and image directory that duplicate each other non-atomically. The snooping protocol utilizes the duality of directories coupled with the non-atomicity of directory updates to maximize processor-cache availability and minimize processor-cache access times thus supporting high performance architectures.

11 Claims, 21 Drawing Sheets

EXAMPLE CACHE ADDRESSING: CACHE ARRAY (SET 1, BLOCK 1)

ADDRESS: FFF00005  BLOCK STATUS       DATA BLOCK
TAG: FFF00         PV = 01 ⇒ COPY     WORD 0: A0A0A0A0A0A0
SET: 1                                WORD 1: B0B0B0B0B0B0
WORD: 1                               WORD 2: C0C0C0C0C0C0
                                      WORD 3: D0D0D0D0D0D0

Fig.4
EXAMPLE IMAGE ARRAY ADDRESSING: ARRAY(SET1, BLOCK1)
ADDRESS: FFF00005    BLOCK STATUS
TAG: FFF00           PV = 01 → COPY
SET: 1
WORD: 1
Fig.4A
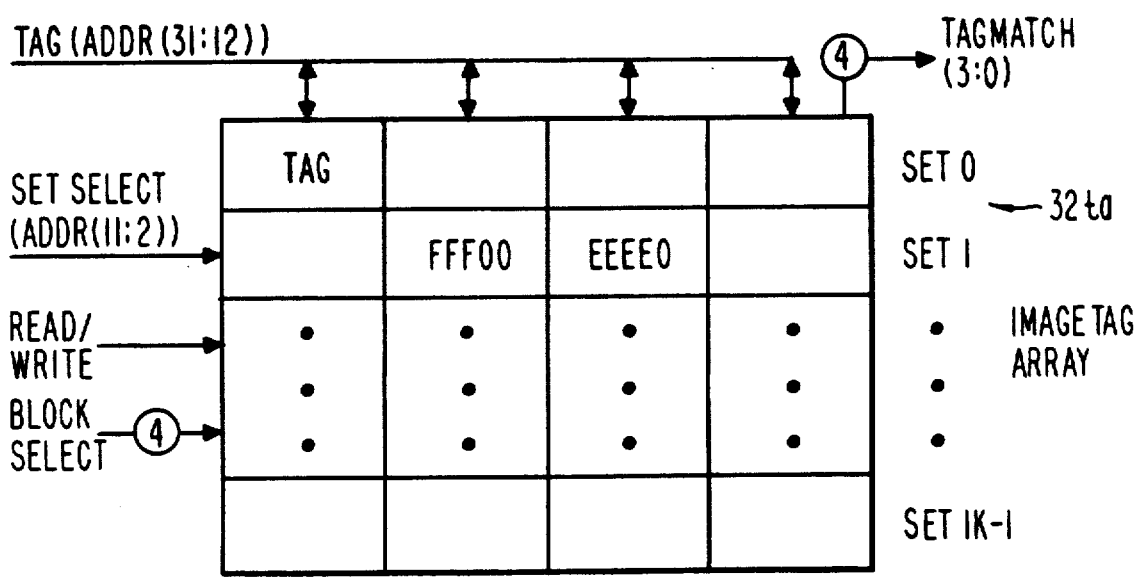
Fig.4B
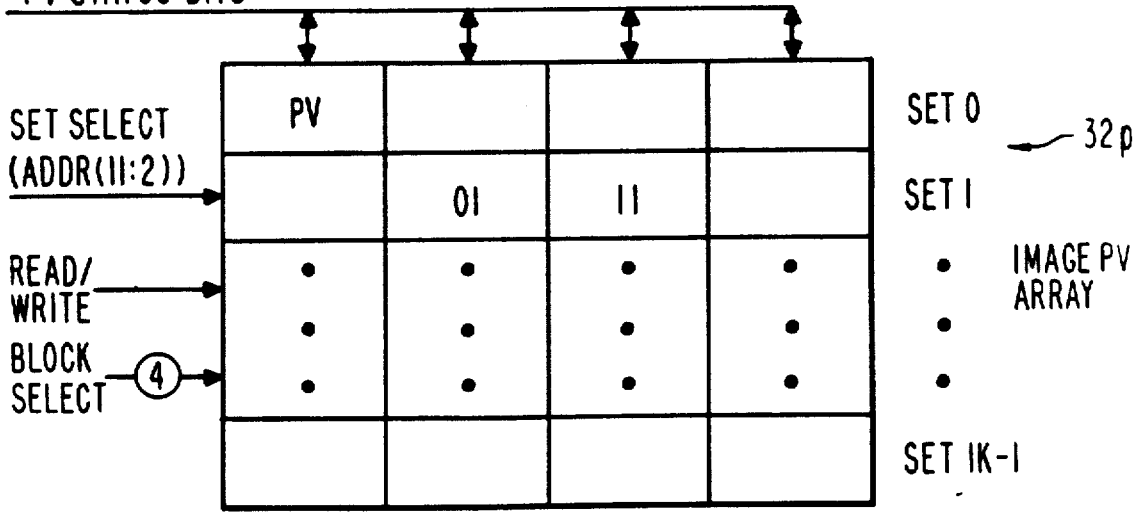

Fig. 5A

| | CLOCK A | CLOCK A+1 | CLOCK A+2 |
|---|---|---|---|
| COMMAND TRANSMIT | COMMAND ADDRESS, PARTITION-ID, SOURCE-ID/DEST.-ID, BUS TOKEN, DATA WORD-A DRIVEN ON BUS | DATA WORD-B DRIVEN ON BUS FOR FOUR WORD TRANSMISSIONS ONLY | DATA WORD-C DRIVEN ON BUS FOR FOUR WORD TRANSMISSIONS ONLY |
| COMMAND EVALUATE | | PARITY CHECKS, COMMAND DECODE, IMAGE READ, ID COMPARISION, TAKES COMPARISON, ADDRESS COMP  ⎱ DETERMINE INDIVIDUAL BUS RESPONSE TO DRIVE ON NEXT CLOCK | PARITY CHECK ON DATA WORD-B, IMAGE ADDRESS PARITY CHECK  ↓ DETERMINE INDIVIDUAL BUS RESPONSE TO DRIVE ON NEXT CLOCK |
| TRANSMIT INDIV. BUS RESPONSE | | | DRIVE INDIVIDUAL BUS RESPONSE FOR A |
| ACCUMULATE COLLECTIVE RESPONSE | | | |

Fig.5B

| CLOCK A+3 | CLOCK A+4 | CLOCK A+5 | CLOCK A+6 |
|---|---|---|---|
| COLLECTIVE RESPONSE DECODE ACCEPT/REJECT 1 WORD COMMANDS | | | COLLECTIVE RESPONSE DECODE ACCEPT/REJECT 4 WORD COMMANDS |
| DATA WORD-D DRIVEN ON BUS FOR FOUR WORD TRANSMISSION ONLY | | | |
| PARITY CHECK ON DATA WORD-C, IMAGE ADDRESS PARITY CHECK ↓ DETERMINE INDIVIDUAL BUS RESPONSE TO DRIVE ON NEXT CLOCK | PARITY CHECK ON DATA WORD-D, IMAGE ADDRESS PARITY CHECK ↓ DETERMINE INDIVIDUAL BUS RESPONSE TO DRIVE ON NEXT CLOCK | | |
| DRIVE INDIVIDUAL BUS RESPONSE FOR B | DRIVE INDIVIDUAL BUS RESPONSE FOR C | DRIVE INDIVIDUAL BUS RESPONSE FOR D | |
| DECODE COLLECTIVE RESPONSE FOR A  RECEIVERS: IF ACK ACCEPT, ELSE REJECT  TRANSMITTER: IF ACK CLEAR, ELSE RETRY (FOR 1-WORD COMMANDS ONLY) | DECODE COLLECTIVE RESPONSE FOR B  RECEIVERS: IF ACK ACCEPT, ELSE REJECT | DECODE COLLECTIVE RESPONSE FOR C  RECEIVERS: IF ACK ACCEPT, ELSE REJECT | DECODE COLLECTIVE RESPONSE FOR D  RECEIVERS: IF ACK ACCEPT, ELSE REJECT  TRANSMITTER: IF ACK CLEAR, ELSE RETRY (FOR 4-WORD COMMANDS ONLY) |

Fig.5

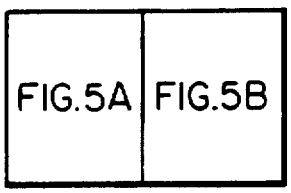

| FIG.5A | FIG.5B |

Fig.6

| COMMAND | CMD(5:0) | ADDRESS | DATA | EXPECTED RETURN | SYS. BUS COMMAND |
|---|---|---|---|---|---|
| SR | 000001 | VALID | INVALID | TBS/RESULT | YES |
| PR | 000010 | VALID | INVALID | TBP/RESULT | YES |
| TODR | 000011 | INVALID | INVALID | TOD/RESULT | YES |
| TODW | 000100 | INVALID | VALID | RESULT | YES |
| SPES | 000101 | VALID | VALID | SPESRESP | YES |
| PURGE | 000110 | VALID | VALID | NONE | YES |
| NDOW | 000111 | VALID | VALID | RESULT | YES |
| NDPW | 001000 | VALID | VALID | RESULT | YES |
| RESULT | 011100 | VALID | INVALID | NONE | YES |
| TBP | 010010 | VALID | VALID | NONE | YES |

Fig. 7

| COMMAND | CMD(5:0) | ADDRESS | DATA | EXPECTED RETURN | SYS. BUS COMMAND |
|---|---|---|---|---|---|
| SR | 000001 | VALID | INVALID | PURGE/RESULT | YES |
| PR | 000010 | VALID | INVALID | TBP/RESULT | YES |
| TOD | 010011 | INVALID | VALID | NONE | YES |
| TBS | 010001 | VALID | VALID | NONE | YES |
| TBP | 010010 | VALID | VALID | NONE | YES |
| INVCOPY | 001110 | VALID | INVALID | NONE | NO |
| NDOW | 000111 | VALID | VALID | RESULT | YES |
| NDPW | 001000 | VALID | VALID | RESULT | YES |
| RESULT | 011100 | VALID | INVALID | NONE | YES |
| SPESRESP | 010101 | VALID | VALID | INVALID | NONE |

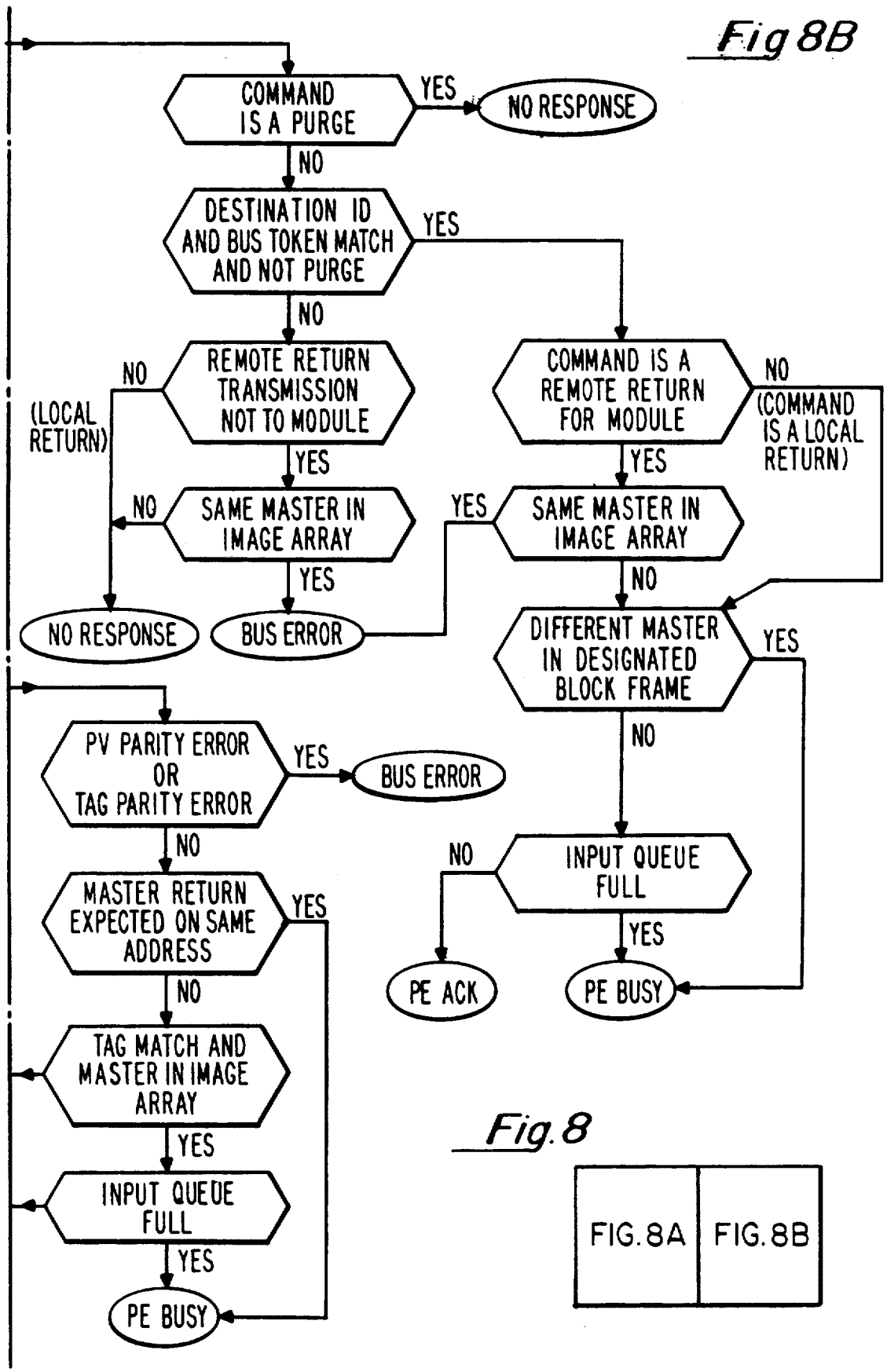

Fig. 9 COLLECTIVE RESPONSE AND COMMAND ACCEPTANCE

| COMMAND | SENDER CLASS | RECEIVER CLASS | ERROR | PE_ACK | PE_BUSY | MM_ACK | MM_BUSY | COLLECTIVE RESPONSE | COMMAND ACCEPTANCE FOR RECEIVING MODULE OF CLASS |
|---|---|---|---|---|---|---|---|---|---|
| SR, PR, NDOW NDPW RESULT | PE | PE, MM | 0 | 1 | 0 | 1 | 0 | ACKNOWLEDGE | PE |
| | | | 0 | 1 | 0 | 0 | 1 | ACKNOWLEDGE | PE |
| | | | 0 | 0 | 0 | 1 | 0 | ACKNOWLEDGE | MM |
| | | | 0 | 0 | 0 | 0 | 1 | BUSY | NOT ACCEPTED |
| | | | 0 | DONT CARE | 1 | 0 | 1 | BUSY | NOT ACCEPTED |
| | | | 0 | DONT CARE | 1 | 1 | 0 | BUSY | NOT ACCEPTED |
| | | | ALL OTHER COMBINATIONS ARE TAKEN TO BE ERRORS | | | | | ERROR | NOT ACCEPTED |
| PURGE, TODR TODW | PE | MM | 0 | 0 | 0 | 1 | 0 | ACKNOWLEDGE | MM |
| | | | 0 | 0 | 0 | 0 | 1 | BUSY | NOT ACCEPTED |
| | | | ALL OTHER COMBINATIONS ARE TAKEN TO BE ERRORS | | | | | ERROR | NOT ACCEPTED |
| TBP, RESULT, TBS, TOD | PE, MM | PE | 0 | 1 | 0 | 0 | 0 | ACKNOWLEDGE | PE |
| | | | 0 | 1 | 1 | 0 | 0 | BUSY FOR TBP MM SENDER | NOT ACCEPTED |
| TBS, TOD | MM | PE | ALL OTHER COMBINATIONS ARE TAKEN TO BE ERRORS | | | | | ERROR | NOT ACCEPTED |
| SPEC, SPESACK | PE | PE | 0 | 1 | 0 | 0 | 0 | ACKNOWLEDGE | PE |
| | | | ALL OTHER COMBINATIONS ARE TAKEN TO BE ERRORS | | | | | ERROR | NOT ACCEPTED |

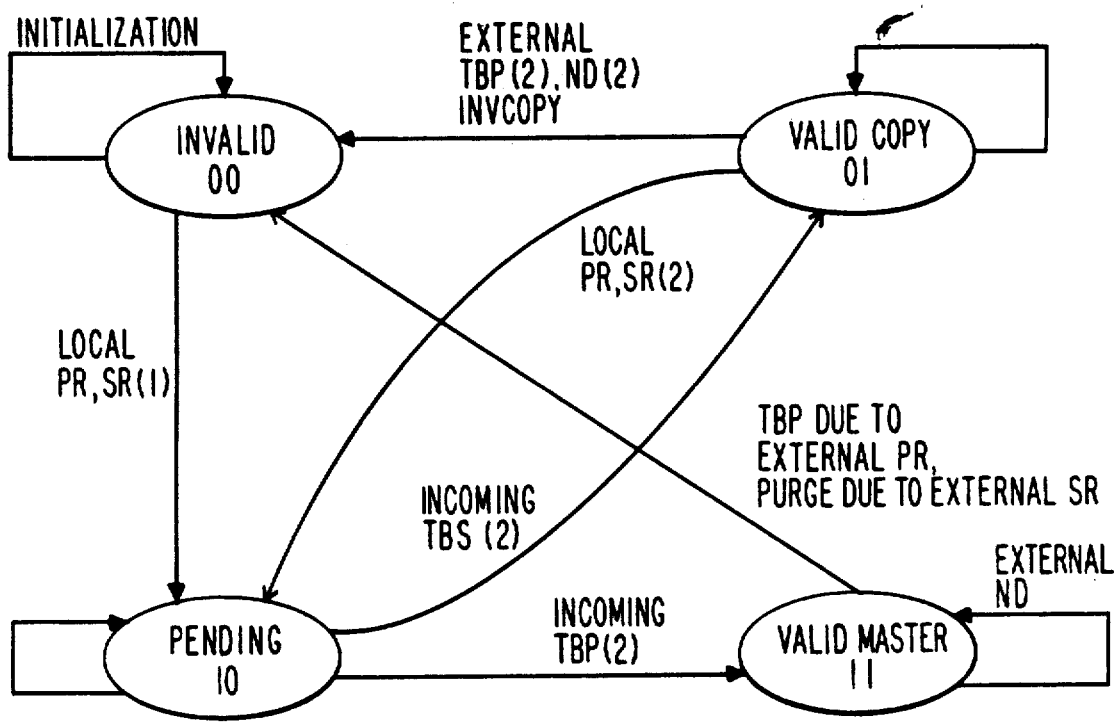
Fig.10 STATUS CHANGES IN CACHE DIRECTORY
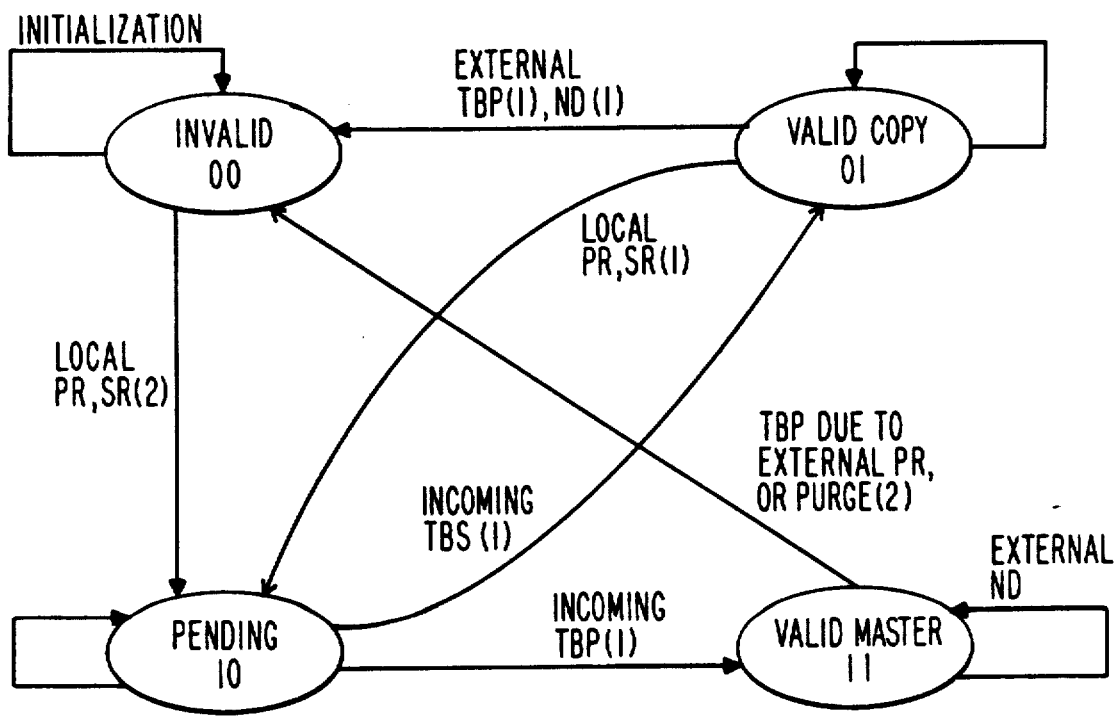
Fig.11 STATUS CHANGES IN IMAGE DIRECTORY

Fig.12B

| TIME | ACTION | P1 CACHE DIRECTORY STATUS | P1 IMAGE DIRECTORY STATUS | P2 CACHE DIRECTORY STATUS | P2 IMAGE DIRECTORY STATUS |
|---|---|---|---|---|---|
| t0 | P1 ISSUES READ TO CACHE CONTROL | INVALID | INVALID | INVALID | INVALID |
| t1 | P1: CACHE CONTROLLER UPDATES CACHE DIRECTORY | PENDING | INVALID | INVALID | INVALID |
| t2 | P1: CACHE ISSUES SR TO BIU | PENDING | INVALID | INVALID | INVALID |
| t3 | P1: BIU TRANSMITS SR ON SYSTEM BUS | PENDING | INVALID | INVALID | INVALID |
| t4 | P1: BIU CHECKS IMAGE DIRECTORY<br>P2: BIU CHECKS IMAGE DIRECTORY<br>MM: RECEIVES PR COMMAND | PENDING | INVALID | INVALID | INVALID |
| t5 | MM: ISSUES COPY VIA A TBS IN RESPONSE TO THE SR | PENDING | INVALID | INVALID | INVALID |
| t6 | P1: BIU CHECK IMAGE DIRECTORY ACCEPTS TBS UPDATES IMAGE DIRECTORY | PENDING | COPY | INVALID | INVALID |
| t7 | P1: BIU FORWARDS TBS TO CACHE | PENDING | COPY | INVALID | INVALID |
| t8 | P1: CACHE RECEIVES TBS PASSES REQUESTED WORD TO PROCESSOR COMPLETING READ OPERATION AND UPDATES CACHE DIRECTORY | COPY | COPY | INVALID | INVALID |

Fig.13B

| TIME | ACTION | P1 CACHE DIRECTORY | P1 IMAGE DIRECTORY | P2 CACHE DIRECTORY | P2 IMAGE DIRECTORY |
|---|---|---|---|---|---|
| t0 | PE2 ISSUES WRITE TO CACHE CONTROLLER | COPY | COPY | INVALID | INVALID |
| t1 | P2: CACHE CONTROLLER UPDATES CACHE DIRECTORY | COPY | COPY | PENDING | INVALID |
| t2 | P2: CACHE ISSUES PR TO BIU | COPY | COPY | PENDING | INVALID |
| t3 | P2: BIU TRANSMITS PR ON SYSTEM BUS | COPY | COPY | PENDING | INVALID |
| t4 | P1: BIU CHECKS IMAGE DIRECTORY<br>P2: BIU CHECKS IMAGE DIRECTORY<br>MM: RECEIVES PR COMMAND REQUEST | COPY | COPY | PENDING | INVALID |
| t5 | MM: ISSUES MASTER VIA A TBP IN RESPONSE TO THE PR | COPY | COPY | PENDING | INVALID |
| t6 | P1,P2: BIU CHECK IMAGE DIRECTORY<br>P2: BIU ACCEPTS TBP, UPDATES IMAGE DIRECTORY<br>P1: BIU INVALIDATES IMAGE DIRECTORY | COPY | INVALID | PENDING | MASTER |
| t7 | P1: BIU FORWARD INVALIDATE COMMAND TO CACHE | COPY | INVALID | PENDING | MASTER |
| t8 | P1: CACHE RECEIVES INVALIDATE AND UPDATES CACHE DIRECTORY | INVALID | INVALID | PENDING | MASTER |
| t9 | P2: BIU FORWARDS TBP TO CACHE | INVALID | INVALID | PENDING | MASTER |
| t10 | P2: CACHE RECEIVES TBP COMPLETES WRITE OPERATION AND UPDATES CACHE DIRECTORY | INVALID | INVALID | MASTER | MASTER |

Fig.14B

| TIME | ACTION | P1 CACHE DIRECTORY STATUS | P1 IMAGE DIRECTORY STATUS | P2 CACHE DIRECTORY STATUS | P2 IMAGE DIRECTORY STATUS |
|---|---|---|---|---|---|
| t0 | PE1 ISSUES WRITE TO CACHE CONTROLLER | INVALID | INVALID | MASTER | MASTER |
| t1 | P1: CACHE CONTROLLER UPDATES CACHE DIRECTORY | PENDING | INVALID | MASTER | MASTER |
| t2 | P1: CACHE ISSUES PR TO BIU | PENDING | INVALID | MASTER | MASTER |
| t3 | P1: BIU TRANSMITS PR ON SYSTEM BUS | PENDING | INVALID | MASTER | MASTER |
| t4 | P1: BIU CHECKS IMAGE DIRECTORY P2: BIU CHECKS IMAGE DIRECTORY, ACCEPTS PR | PENDING | INVALID | MASTER | MASTER |
| t5 | P2: BIU FORWARDS PR TO ITS CACHE | PENDING | INVALID | MASTER | MASTER |
| t6 | P2: CACHE ISSUES MASTER VIA A TBP TO THE BIU AND UPDATES IT'S DIRECTORY | PENDING | INVALID | INVALID | MASTER |
| t7 | P2: BIU TRANSMITS TBP ON SYSTEM BUS | PENDING | INVALID | INVALID | MASTER |
| t8 | P2: BIU UPDATES IMAGE DIRECTORY P1: BIU CHECKS IMAGE DIRECTORY ACCEPTS TBP UPDATES IMAGE DIRECTORY | PENDING | MASTER | INVALID | INVALID |
| t9 | P1: BIU FORWARDS TBP TO CACHE | PENDING | MASTER | INVALID | INVALID |
| t10 | P1: CACHE RECEIVES TBP COMPLETES WRITE OPERATION AND UPDATES CACHE DIRECTORY | MASTER | MASTER | INVALID | INVALID |

Fig.15B

| TIME | ACTION | P1 CACHE DIRECTORY STATUS | P1 IMAGE DIRECTORY STATUS | P2 CACHE DIRECTORY STATUS | P2 IMAGE DIRECTORY STATUS |
|---|---|---|---|---|---|
| t0 | PE2 ISSUES READ TO CACHE CONTROLLER | MASTER | MASTER | INVALID | INVALID |
| t1 | P2: CACHE CONTROLLER UPDATES CACHE DIRECTORY | MASTER | MASTER | PENDING | INVALID |
| t2 | P2: CACHE ISSUES SR TO BIU | MASTER | MASTER | PENDING | INVALID |
| t3 | P2: BIU TRANSMITS SR ON SYSTEM BUS | MASTER | MASTER | PENDING | INVALID |
| t4 | P2: BIU CHECKS IMAGE DIRECTORY P1: BIU CHECKS IMAGE DIRECTORY, ACCEPTS SR | MASTER | MASTER | PENDING | INVALID |
| t5 | P1: BIU FORWARDS SR TO ITS CACHE | MASTER | MASTER | PENDING | INVALID |
| t6 | P1: CACHE ISSUES MASTER VIA A PURGE COMMAND | INVALID | MASTER | PENDING | INVALID |
| t7 | P1: BIU TRANSMITS PURGE ON SYSTEM BUS TO THE BIU AND INVALIDATES CACHE DIRECTORY | INVALID | MASTER | PENDING | INVALID |
| t8 | MM: RECEIVES PURGE AND ASSOCIATED MASTER P1: BIU UPDATES IMAGE DIRECTORY P2: BIU CHECKS IMAGE DIRECTORY ACCEPTS PURGE & TRANSLATES IT AS A TBS, UPDATES IMAGE DIRECTORY | INVALID | INVALID | PENDING | COPY |
| t9 | P2: BIU FORWARDS TBS TO CACHE | INVALID | INVALID | PENDING | COPY |
| t10 | P2: CACHE RECEIVES TBS FORWARDS REQUESTED WORD TO PE COMPLETES THE READ OPERATION AND UPDATES CACHE DIRECTORY | INVALID | INVALID | COPY | COPY |

HARDWARE IMPLEMENTED CACHE COHERENCY PROTOCOL WITH DUPLICATED DISTRIBUTED DIRECTORIES FOR HIGH-PERFORMANCE MULTIPROCESSORS

FIELD OF THE INVENTION

This disclosure refers to multiprocessor systems having individual cache memories including means to keep the cache memories coherent.

BACKGROUND OF THE INVENTION

Due to the continually increasing demands for computing power and speed, the use of multiprocessor networks has been continually brought to the fore for handling computational problems. However, when it comes to the design and programming of efficient multiprocessor systems, a number of problems are presented among which are the problems of synchronizing various of the processes used and maintaining data coherence plus the proper ordering of events. These are all factors which must be addressed by the designer.

In a multiprocessor system, there is generally an instruction set which contains basic instructions used for the handling of synchronization and communication between various processing activities.

In these situations, the concept of "communication" refers to the exchange of data between different processing activities while the concept of "synchronization" is a special type of communication in which the data transferred is involved with control data information. Synchronization is used for the dual purpose of regulating the proper sequencing of processes and for insuring mutually exclusive access to certain shared data. The multiprocessor systems which use shared-memory will provide for the handling of communication and synchronization by the use of the controlled sharing of data in memory.

A major problem involved in these systems is that of memory coherence which involves the system's ability to execute memory operations correctly. Multiprocessor systems also have a requirement for sequential consistency which means that there must be a certain order in the allowable sequence of executive instructions during the same process activity which may be shared by different processors. For example, it may be noted that when two concurrent processors are operating, they can effect each others execution through the sharing of writable data and the sending of interrupt signals, but it is the order of these events that is of significant importance. Accesses to shared writable (alterable) data should be executed in a mutually exclusive manner.

The problem of "coherency" is an ever-present problem in that contradictory information or inconsistencies can occur between various ones of the memories involved. As an example, in a computer having a processor and main memory together with a cache, it may be found that the cache and main memory may contain inconsistent copies (contradictory) of data. Thus multiple cache memories could possess different copies of the same memory block due to the fact that one or more of the processors has modified its own private copy. This type of inconsistency could possibly affect correct execution of a program.

Thus the problem of inconsistency or "cache incoherence" can occur due to the following: (a) sharing of writable data; (b) process migration; (c) I/O activity.

In some systems the process activity is allowed to migrate, that is to be scheduled in different processors in order to balance the workload. When this occurs in a multiprocessor system whereby each processor has its own private cache, then data inconsistencies can result.

Previous methods of handling the coherency of memory or handling of data inconsistency have included the following techniques: (i) to use only shared cache memories which are associated with the main memory module and not permit any "private" cache memory for each individual processor; (ii) attaching a private cache memory to each processing unit, but operating such that any "shared writable data" is not permitted in the cache memory. This type of data is called "non-cachable". The instructions and other data, which can be copied into cache memory, would be referred to as "cachable". However, in this situation, the data must be tagged as to whether it is cachable or noncachable; (iii) tagging of shared writable data as noncachable and in this case, the performance of the system is considerably diminished; (iv) a system which allow shared writable data to exist in multiple cache memories but which requires a centralized global table which stores the status of memory blocks so that coherence enforcement signals can be generated on the basis of the status of the memory block; (v) the use of a "snooping" cache controller which can be used in bus-oriented multiple processors having a table that records the status of each memory block and which can be efficiently distributed among the processors involved. Consistency between the cache memories here is maintained by a bus-watching mechanism called the "snooping cache controller" which implements the cache coherency protocol on the bus.

For example, in a multiprocessor network, where each processor has its own private cache memory, the snooping controllers are used to watch the system bus for the "Store" command. If a store operation is made to a location in a cache memory, then the "copies" of this block of memory in the cache are updated.

A detailed discussion of the various problems involved in such type of multiprocessor systems is discussed in a Feb. 1988 article entitled "Synchronization, Coherence, and Event Ordering in Multiprocessors" (pages 9 through 21 in Computer, published by IEEE, by the authors Dubois, Scheurich, and Briggs).

The present disclosure provides improved methods for handling the coherency problems in multiprocessor systems by the provision of a snooping cache coherency protocol for shared bus multiprocessors. The improved system provides for the update of the cache memory and an image directory unit on a serial basis often designated as "non-atomic" which is to indicate that the updates are done at different times and not concurrently. The non-atomicity of the directory updates thus allows for the processor-to-cache memory cycle time to be minimized and provide for a higher performance throughput.

SUMMARY OF THE INVENTION

The present disclosure involves improvements to multiprocessor networks wherein each processor has a private cache memory and the network is connected through a common system bus. The network is provided with a snooping cache coherency protocol having distributed directories such that the updates of each cache memory and its associated image directory are accomplished at different time periods (non-atomic)

thus permitting the processor-to-cache cycle time to be minimized.

The non-atomicity of directory updates will cause directory inconsistencies (in various memory blocks) to occur during the period between updates. The system bus protocol is arranged to allow for correct operation to maintain data coherency, despite the temporary period of inconsistency.

The protocol supports a memory subsystem which queues memory requests such that the processor, or cache memory requesting data, relinquishes the shared bus after making its request.

While previous implementations used atomic (concurrent) directory updates using two basic schemes, these schemes caused an increase in processor-cache memory cycle time. These schemes involved a split cycle with duplicated directories or the use of dual ports to the same directory. In the present situation, time-independent directory updates allow the processor-to-cache access time to be minimized thus allowing for a high performance multiprocessor architecture.

BRIEF DESCRIPTION OF DRAWINGS

FIGS. 5A, 5B are timing charts illustrating the Command Transmit-Receive Sequence;

FIG. 6 is a list of the cache-to-bus interface unit commands;

FIG. 7 is a list of the bus interface unit-cache commands;

FIGS. 8A and 8B are flow charts illustrating the sequence of activities on the bus response lines;

FIG. 9 is a table indicating how commands are accepted depending on the collective bus response;

FIGS. 10 and 11 are schematic drawings showing the state changes in the cache PV array and the image PV array;

FIGS. 12A and 12B are examples used to illustrate data transfers (copy) and the non-atomicity of directory updates.

FIGS. 13A and 13B are examples used to illustrate data transfers (master) and the non-atomicity of directory updates;

FIGS. 14A and 14B are examples used to illustrate cache-cache data transfer (Master) and the directory updates;

FIGS. 15A and 15B are examples used to illustrate cache-cache data transfer (copy) and the directory updates;

DESCRIPTION OF PREFERRED EMBODIMENT

Figure 1:
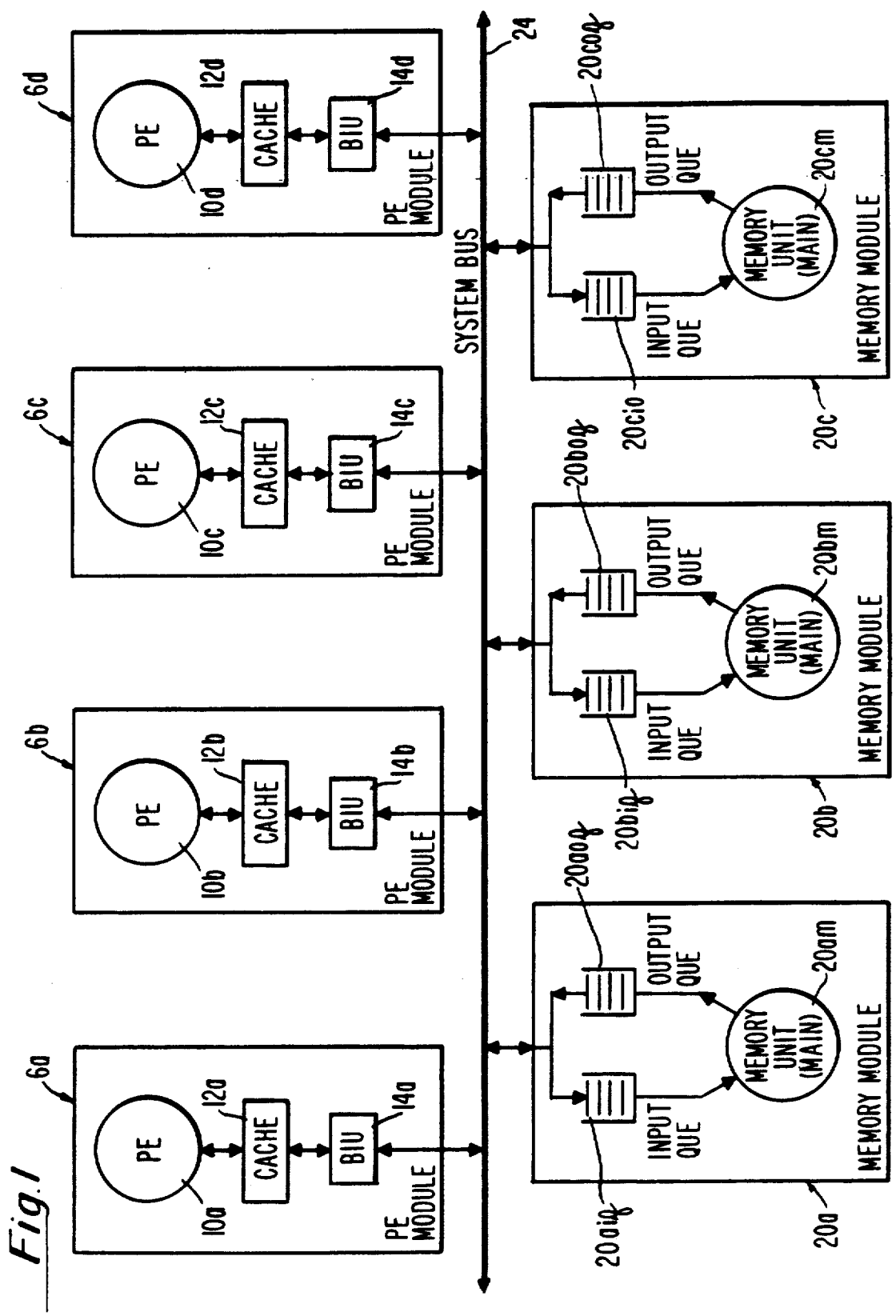
FIG. 1 is a block diagram of a multiprocessor network architecture.

Multiprocessor Architecture (FIG. 1)

FIG. 1 shows a multiprocessor network having a series of processor element modules (PE modules) 6a, 6b, 6c, 6d which are connected to a system bus 24. Also connected to the system bus 24 is a group of memory modules (MM's) 20a, 20b, and 20c.

Each PE module, 6a, 6b, 6c, 6d, has processing element (PE) shown as 10a, 10b, 10c, 10d, a private cache memory unit shown as 12a, 12b, 12c, 12d, and a bus interface unit (BIU) shown as 14a, 14b, 14c, and 14d.

Each PE is linked to its cache memory unit (also called a private cache) which, in turn, is connected to a BIU which links the module to the system bus 24.

Each memory module (20a, 20b, 20c) consists of an input queue shown as 20aiq, 20biq, 20ciq, an output queue shown as 20aoq, 20boq, 20coq, and a main memory unit designated 20am, 20bm, 20cm. The input queue queues up accesses (request commands) to the main memory unit. The main memory unit responds to each access by placing a return command in the corresponding output queue. The return command is a system bus command used to transfer information back to the requesting module in response to a request command. The input queue receives commands from the system bus and output queue transmits commands onto the system bus.

Thus the system consists of processing elements with private caches, queueing memory modules and a system bus which interconnects all processor and memory modules. The system bus is a backplane bus operated in a synchronous manner. The signals which use the system bus are described hereinafter under the heading "System Bus Signals".

Figure 2:
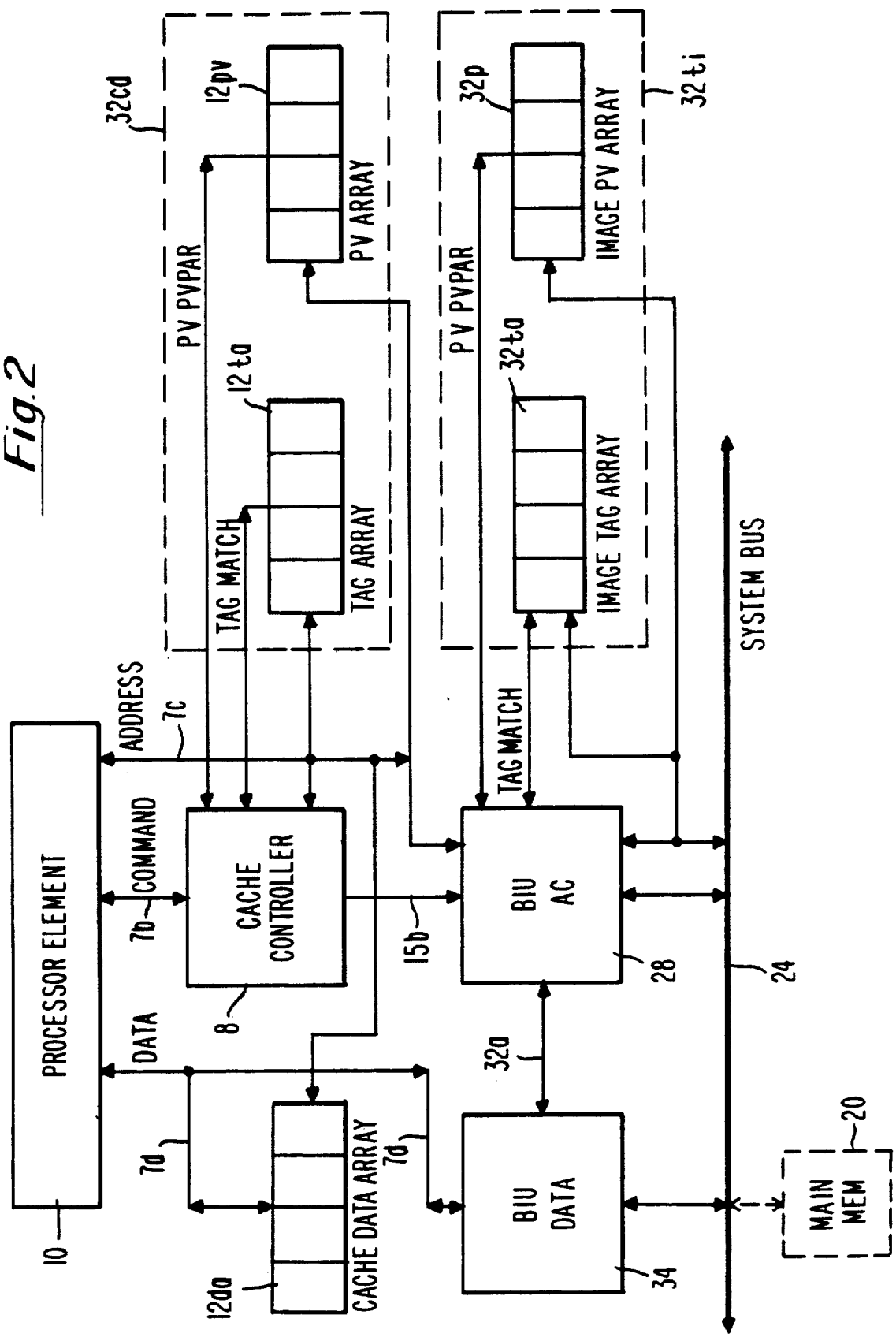
FIG. 2 is a block diagram of the architecture for the cache memory and bus interface unit for each processor.

Cache and BIU Architecture (FIG. 2)

FIG. 2 shows in detail the components of the cache and bus interface unit (BIU) and how they are interconnected.

The processor 10, typical of each of the processors 10a, 10b, 10c, and 10d, etc., connects to a cache controller circuit 8 by means of a command bus 7b. The command bus 7b is used by the processor 10 in order to transmit commands to the cache controller 8. These commands are typically Read, Write, etc.

The address bus designated 7c is driven by the processor 10, or by the the cache controller 8, or by the BIU 28. The address bus 7c carries the address of a particular data word or specific status information. Arbitration as to who shall have access to the address bus 7c is controlled by the cache controller 8.

The data bus 7d is used to connect the processor 10 and the cache data array unit 12da. The cache data array unit 12da is also connected to the BIU Data device 34 by means of data bus 7d. Data is transferred from the cache 12da to the BIU Data device 34 via the data bus 7d, and from the BIU Data device 34 to main memory 20, or to BIU's on other modules, over the system bus 24.

Figures 3, 3A:
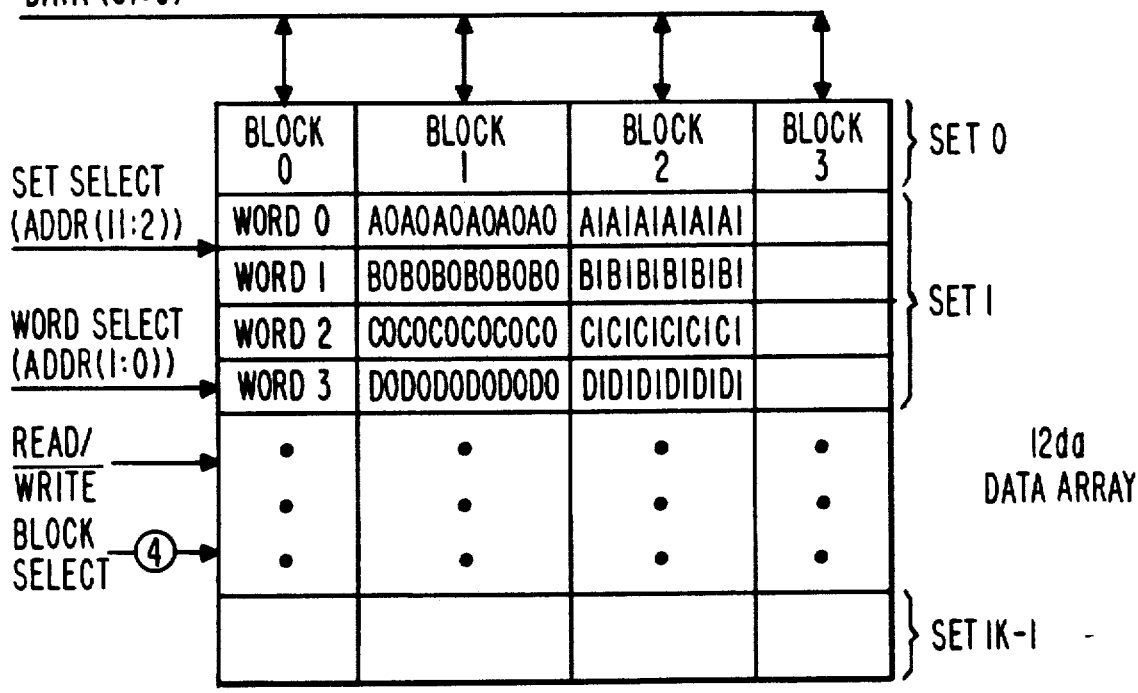
FIGS. 3A, 3B and 3C are schematic drawings illustrating the organization of the cache memory showing the cache data array, tag array, and PV array.

The cache memory data array 12da is a memory which is used to store data from the memory module 20 for subsequent use by the processor 10. The detailed architecture of the cache memory data array 12da is shown in FIG. 3A.

Figure 3B:
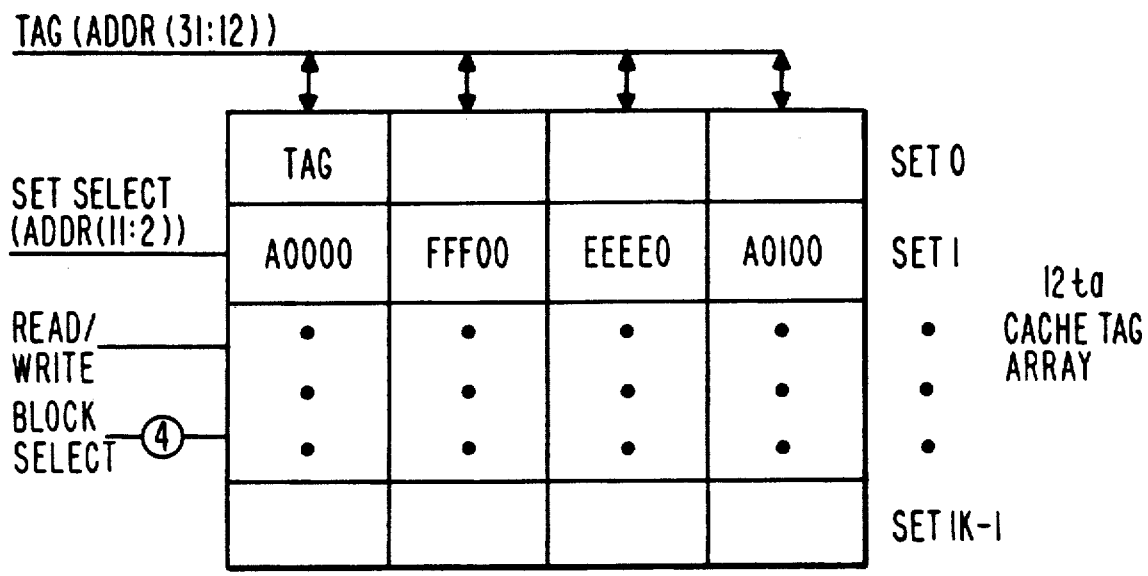
Figure 3C:
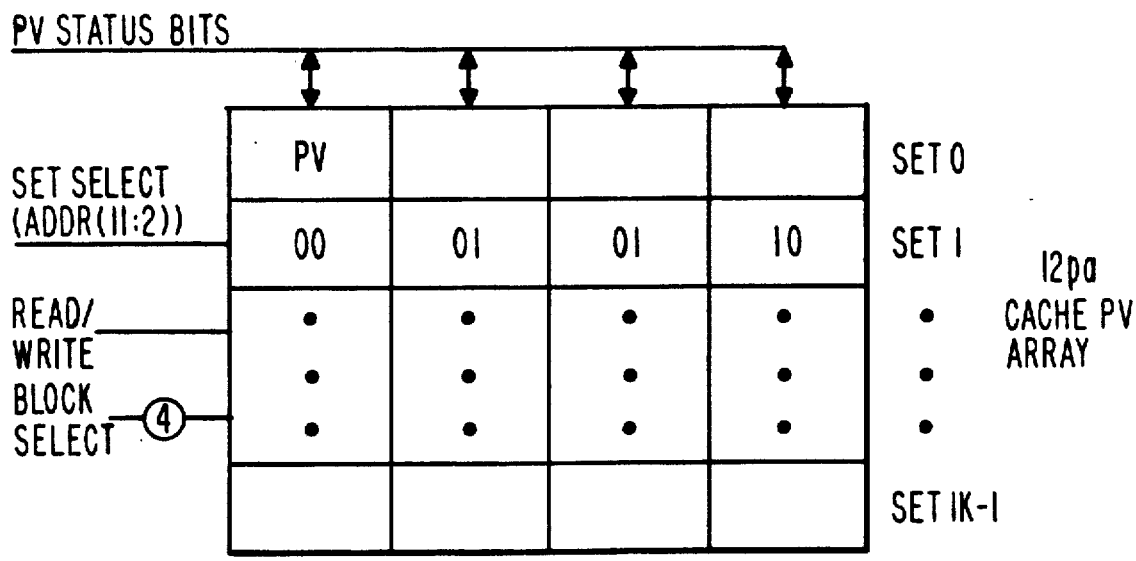

Connected to the cache controller 8 and to the address bus 7c is the cache memory tag array 12ta FIG. 3B. Since a portion of the address of a data block is designated as the "tag", this portion designated as the tag is stored in the cache memory tag array 12ta. Thus for every data block stored in the cache memory data array 12da, the cache memory tag array 12ta will store its own associative tag. The cache memory tag array 12ta, is part of the cache directory 32cd which also includes the cache memory PV array 12pv. The cache memory tag array 12ta as part of the cache directory, is used to find out whether a particular data block resides in the cache memory data array 12da.

The cache memory PV array 12pv is also part of the cache directory 32cd. The cache PV array 12pv stores the "status" of each cache data block that resides in the cache data array 12da. Each data block in the cache data array 12da will be found to be in one of four states; invalid, copy, master, pending. These states are illustrated in FIG. 10.

As seen in FIG. 2, the cache directory 32cd is made up of the cache tag array 12ta together with the cache PV array 12pv.

The data bus between the cache data array 12da and the BIU 34 is shown as bus 7d. The bus designated 15b is the command bus for transmitting commands between the cache controller 8 and the BIU 28. The commands transferred on this command bus 15b are listed in the tables in FIGS. 6 and 7.

The BIU (bus interface unit) consists of two chips, the BIU-Data Chip 34 and the BIU address and control chip 28 (BIU-AC). The BIU-AC 28 controls the BIU-Data 34, by means of the control bus 32a. The main functions of the BIU are to "snoop" on the system bus 24 to maintain coherent data and also buffer data, such data going from the cache memory 12da to the system bus 24, and reversely from the system bus 24 to the cache memory data array 12da.

The BIU-AC 28 (FIG. 2) receives commands from the cache controller 8 and transmits them on the system bus 24. Likewise, any commands arriving from the system bus 24, which are relevant to the particular module, are received by the BIU-AC and then passed on to the cache controller 8.

The BIU-AC 28 implements the bus protocol which guarantees coherent data in the cache. To maintain data coherency the BIU-AC 28 needs to know the state of all data held in the cache. It does so by means of the image directory 32ti. The image directory is an exact copy of the cache directory 32cd, and consists of the image tag array 32ta and the image PV array 32p. FIGS 4A and 4B show the organization of the image directory in detail.

Cache Organization (FIGS. 3, 3A, 3B, 3C)

The signals which connect the cache directory 32cd to the cache controller 8 are as follows: The TAG address bits [31:12] are stored in the tag array 12ta, FIG. 3B. The PV status bits are stored in the PV array 12pv, FIG. 3C. Data is stored in the cache data array 12da, FIG. 3A. All three arrays are addressed by the ten address bits ADDR[11:2] obtained from address bus 7c. The ten address bits define 1k sets, where each set consists of four blocks. The BLOCK SELECT lines select one block in any set for writing. The READ/WRITE line selects a read or write operation on the arrays.

Given an address, the TAGMATCH lines (FIGS. 3B, 4B) indicate whether, and in which block, the address exists, while the PV status lines indicate the status of the desired block in the set.

Image Organization (FIGS. 4, 4A, 4B)

The signals which connect the image directory 32ti to the BIU-AC 28 are as follows. The TAG (address bits [31:12]) are stored in the tag array 32ta, FIG. 4A. The PV status bits are stored in the PV array 32p. Both arrays are addressed by the ten address bits ADDR[11:2] obtained from the system bus. The ten address bits define 1k sets, where each set consists of four blocks. The BLOCK SELECT lines select one block in any set for writing. The READ/WRITE line selects a read or write operation on the arrays. Given an address, the TAGMATCH lines indicate whether, and in which block, the address exists, while the PV status lines indicate the status of the desired block in the set. Thus the image directory provides a means of maintaining data coherency without accessing the cache directory 32cd.

Further, updates to the image directory are done separately and non-atomically from the cache directory. This feature allows the PE (10) to access the cache as fast and as frequently as desired since the snooping activity is now done by the BIU using the image directory.

Command Transmit Receive Sequence (FIGS. 5A, 5B)

These figures show how commands are transmitted on the system bus 24 on a clock by clock basis.

Commands between BIU and Cache Controller (FIGS. 6 and 7)

These tables show the command encodings for all commands from cache controller 8 to BIU-28 and from BIU-28 to cache controller 8. The commands are described hereinafter under the heading of System Bus Commands.

Figure 8A:
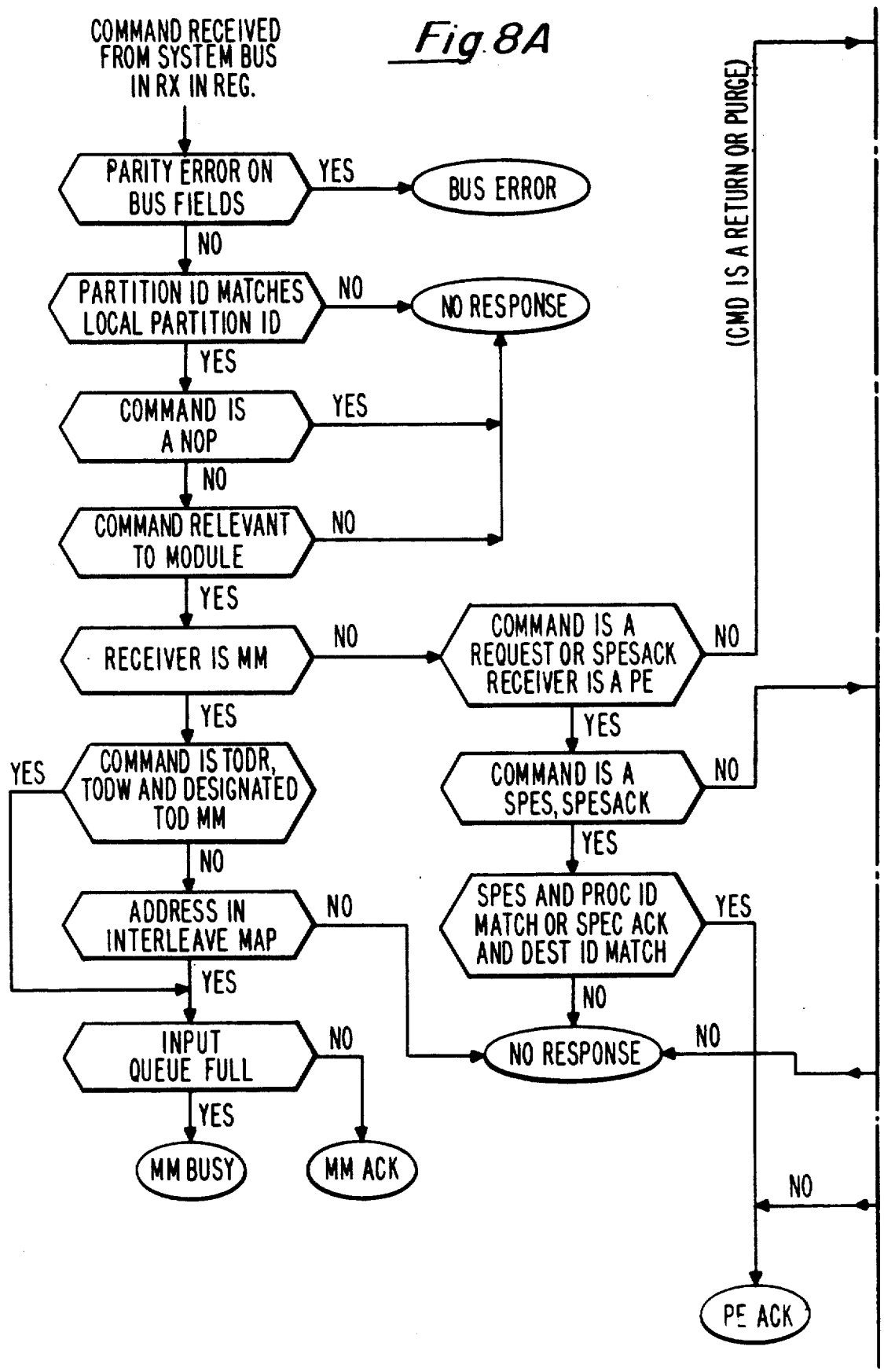

Individual Bus Response Determination (FIGS. 8A, 8B)

This flow chart defines how the bus response lines are asserted based on the system bus command and image status.

Collective Bus Response and Command Acceptance (FIG. 9)

This table shows how commands are accepted based on the collective bus response.

State Changes in Image and Cache PV Arrays (FIGS. 10 and 11)

These State diagrams specify how the status of a data block changes in response to bus commands.

The four examples, discussed hereinafter in connection with FIGS. 12, 13, 14 and 15, illustrate the non-atomicity of directory updates and how the protocol maintains coherency.

The following discussion details the information transfer scheme and the coherency protocol which use the cache and image directories to maintain coherency of data in the multiprocessor system shown in FIG. 1.

Information is transferred from one module to another by means of the system bus. The information relevant here is memory data. Other information, time-of-day, SPES (Signal Processor Element Set), are necessary for overall system operation but have no coherency implications.

A. Information Transfer Scheme

The following subsections detail the information transfer scheme, beginning with the system bus signals in Paragraph A-1, and followed by the system bus commands in Paragraph A-3. In Paragraph A-5 a description of how commands are transmitted and received is provided.

(A-1) System Bus Signals

Each field, or group of signals is defined below:

Address ADDR[31:0]: Thirty-two signal lines are used to convey the address of a data word.

Data DAT[51:0]: Fifty-two data lines are used to transfer one data word per clock.

Command COM[5:0]: The command lines define the type of bus transaction and are defined in Paragraph A-3.

Source ID/Destination ID SDID[4:0]: These lines specify the identification number of either the transmitting module (source) or some specific receiving module called the destination. Whether the ID is a source or destination is implicit in the type of command. Unique ID numbers are assigned to each module at system initialization time.

Bus Request REQ[19:0]: Each module uses a unique Request line by which it signals to all other modules its intention of using the system bus (i.e. bus request). In this particular implementation the system can have up to twenty modules.

(A-2) Bus Response Lines:

PE-ACK: This signal is used by any PE module to acknowledge receiving a bus transmission correctly. If the transmission received was a request command (i.e. a command which is a request for data), then a PE which finds (by reading its image directory) that it has the data will assert PE-ACK. Thus PE-ACK tells the transmitter that its request for data will be honored. It also tells the memory modules that they must ignore the command.

If the transmission received was data, then the receiving module asserts PE-ACK, to inform the transmitter that the data was received correctly.

PE-BUSY: PE-BUSY is used by a receiving PE module to signal the transmitter module that it cannot handle the transmission due to a full input queue. The transmitter will then retransmit later. PE-BUSY also informs the memory modules to ignore the command. PE-BUSY may be asserted by many PE modules at once.

MM-ACK: Memory modules acknowledge a transmission received without error by asserting MM-ACK. Only one memory module may assert MM-ACK at a given time.

MM-BUSY: If a command is received by a memory module which finds its input queue full then it asserts MM-BUSY. The transmitter will retransmit that command later.

BUS-ERROR: Any module which finds an error in a transmission on the system bus, signals the fact by asserting BUS-ERROR. The transmitter will retransmit later.

PARITY SIGNALS: Address, data, command and source/destination ID signals are protected by parity signals. Parity is checked by all modules on every transmission.

(A-3) System Bus Commands

The system bus specified in Paragraph A-1 is used to transfer different types of information. The type of information is defined by the command on the bus command lines. This section specifies all the commands which transfer memory data from MM to PE, PE to PE, and PE to MM. Other commands, which have nothing to do with coherency operations, are also defined because they are essential for system operation. Coherency operations caused by these commands are described in Paragraph B.

No Operation (NOP): When no module is transmitting, the command lines have a logic value of 111111 (binary) due to the open-collector nature of the system bus. Modules read the system bus (i.e., all the lines specified in Paragraph A-1) on every clock. When a module reads the command lines and finds a NOP it knows that there is no transmission.

Shared Read (SR): SR is identified by the logic value 000001 on the command lines. The command originates when a PE reads the data word at some address, say C0C00001 (Hexadecimal) for example, and the cache controller reads its directory (see FIGS. 2 and 3) and finds that none of the tags in set 1 matches the tag of the processor address C0C000. Then the cache controller issues a SR command with the specific address C0C00001 to the BIU which transmits the command on the system bus. The BIU transmits the command (000001), the address (C0C00001) and the specific ID of the module for one clock period.

The memory module which has the address C0C00001 will then send a "copy" of the data block back to the requestor (i.e. the module that issued the SR).

Private Read (PR): PR is identified by the logic value 000010 (binary) on the command lines. The command originates when a PE writes at a specific address, say C0C00001 for example, and the cache controller finds that it does not have that address in its directory. Therefore, the cache controller issues a PR command to the BIU with the address specified as C0C00001. Then the BIU transmits the command (000010), the address (C0C00001), and the ID of the module on the system bus.

The memory, or PE module which finds the data as a "master", will return the data to the requestor designated as a master. A block of data is classified as "master" when it can be modified by the processor element (PE) which has that master block of data in its cache.

Transmit Block Shared (TBS): TBS is identified by the logic value 010001 on the command lines. When a memory module receives a SR command, with address C0C00001 for example, it will send back to the requestor a copy of the data block using a TBS command. The data block consists of the four words at addresses C0C00000, C0C00001, C0C00002 and C0C00003. Since there are four data words the transmission takes four clock cycles. In the first clock the command (010001), the address (C0C001) and the corresponding data word, and the requestors ID are transmitted. On the second, third and fourth clocks, only the data words corresponding to addresses C0C00001, C0C00002 and C0C00003 are transmitted.

Transmit Block Private (TBP): TBP is identified by the logic value 010010 on the command lines. When a memory module or PE module receives a PR command it returns the data using a TBP command. The command implies that the data transferred is designated as a master (private). The transfer takes four clocks and occurs exactly like a TBS.

Purge: A Purge command is used by a PE module when it returns a block of data, designated as a master, back to memory. The command originates at the cache controller, when the PE does a read or write and none of the four blocks in the particular set match the address required by the processor. As described before, the cache controller issues a SR or PR command to get the block of data. The cache controller also determines where in the particular set the requested data is to be placed. If that location already has a valid master, it must be returned back to memory using a Purge command. Note that a master cannot be overwritten like a copy can be. A Purge command takes four clocks on the system bus. In the first clock the address, the command (000110), the ID of the transmitting module and the word corresponding to the address are transmitted. In the second, third and fourth clocks the other data words are transmitted just as in a TBP or TBS command. A Purge command is received by the memory module which contains the specified address.

New Data Write (ND): ND is identified by the logic value 000111 on the command lines. This command provides the capability for PE modules doing I/O functions to overwrite a block in memory, for example when a file is being read from a peripheral device. The command causes the existing master to be overwritten by the new data. If the ND is received by a PE, then the cache controller executes the overwrite, else it is done by the memory module when the master is in memory. The ND command consists of four words and is transmitted like a TBP.

(A-4) The following commands perform functions not related to data coherency. A brief description follows.

Time-of-Day-Read (TODR): A Processor Element (PE) reads the time of day from the memory module which contains the time-of-day clock by issuing a TODR.

Time-of-Day-Write (TODW): A PE may change the time-of-day clock in the memory module by issuing TODW.

Time-of-Day (TOD): A memory module returns the time of day, in response to a TODR by transmitting a TOD command.

Signal PE Set (SPES): A PE may send a message to another PE or set of PE's using the SPES command.

SPES Acknowledge (SPESACK): A PE which receives a SPES may respond by sending back a SPESACK command.

Result: A Result command may be sent as a response to any command to report status or errors.

B. Command Transmit-Receive Sequence on the System Bus

This section describes how the system bus commands are transmitted and received, the role of the bus response lines, and how the "snooping function" uses the image directory. Events are described on a clock-by-clock basis using FIG. 5 which illustrates the entire sequence.

The sequence of actions taken by the transmitter, and by all other receivers are the same for all one-clock commands. The sequence begins in clock A (FIG. 5A) when the transmitter module drives a command on the system bus 24. In clock A+1 all modules 6a, 6b, 6c, 20a, 20b, 20c evaluate the command. Evaluation consists of decoding the command lines to find out what the command means, checking parity (on address, data, source/destination ID and command) and executing the snooping function.

"Snooping" is the process of using the address specified in the bus command to access the image directory to find whether a matching address exists in the image and, if so, what the status of the data (master, copy, invalid, pending) is. The results of the snoop is relevant only if the command is a SR, PR, ND, Purge, TBS or TBP, as defined in Paragraph A-2 above.

The purpose of snooping is to make the appropriate response on the PE-ACK, PE-BUSY or BUS-ERROR lines. The response depends on the type of command received (in Clock A for example) and on the image status for that address. The criteria for driving each response line are outlined next.

Asserting BUS-ERROR in Clock A+2: If a command received has a parity error then the module (may be more than one) which finds the parity error asserts BUS-ERROR.

Asserting PE-ACK in Clock A+2: If command received is SR, PR or ND, and the image state is Master, then PE-ACK is asserted by a PE module (FIG. 5) provided its input queue is not full. If a TBS, TBP (or Result, TOD or SPESACK) is received and the destination ID of the transmission matches the ID of the PE and, the state in the image is "pending" then PE-ACK is asserted. PE-ACK is asserted by only one PE module.

Asserting PE-BUSY in Clock A+2: If the command received is SR, PR or ND, and the image state is Master, then PE-BUSY is asserted when the input queue is full. PE-BUSY is also asserted when an ND command is received, the image state is "copy", and the input queue is full.

Asserting MM-ACK or MM-BUSY in Clock A+2: A memory module which contains the address specified in a SR, PR, ND or Purge command will assert MM-ACK if its input queue is not full. If the input queue is full then MM-BUSY will be asserted.

Four-Clock Commands (ND, TBS, TBP, Purge): Towards the end of clock A+1, each receiver determines for itself whether the command has to be processed. All commands except SPES are meant to be processed by one receiver only. Therefore, for four-clock commands only one receiver is actively receiving the data words in clocks A+1, A+2, A+3. The active receiver uses PE-ACK or MM-ACK (depending on whether the module is a PE or MM) to signal the transmitter whether the data parity was correct. If incorrect parity is found then BUS-ERROR is asserted. The active receiver drives its bus response (FIGS. 5A, 5B) for each data word in clocks A+2 (for data word A), A+3 (for data word B), A+4 (for data word C) and A+5 (for data word D).

The Collective Response: The purpose of driving the individual response (in clock A+2) after a command is received (in clock A+1) is to determine the collective bus response. The collective bus response is determined based on the individual bus response driven by each module. A command is accepted by the receiver, and considered to be successfully transmitted by the transmitter, only when the collective response is an acknowledge. FIG. 9 specifies for each command how the bus response lines are interpreted. The collective response (FIG. 9) guarantees that a command is acknowledged only when all modules agree (by transmitting their individual bus responses on the bus response lines) that a command is error-free.

C. Coherency Functions

This section describes what the coherency rules are, and what actions are taken by the bus protocol to guarantee data coherency. Examples are used to illustrate the various coherency related actions for each command.

(C.1) Coherency Rules:

The bus protocol implements the following rules to guarantee data coherency, i.e., a PE reading any specific address will always find the current value which is the value of the master block. Thus any copies made must have the same value and only one master can exist for each address.

a. At system power-up, master blocks reside in main memory.

b. Any number of PE's may have copies (in their caches) of a given master block located in main memory 20.

c. When a PE obtains the master from memory, other PE's must invalidate their copies of that master.

d. When a PE has a copy, a ND command causes that copy to be invalidated.

e. From the time a PE module issues a PR command till it receives the master block, that PE should assert PE-BUSY in response to all PR, SR and ND commands issued subsequently by other PE's for that same block of data.

f. When a PE has the master block for a given address it must respond with PE-ACK (unless it has an error) for SR, PR and ND commands which are transmitted on the system bus. It must also take appropriate action depending on the type of command to be described hereinafter.

g. When data is requested, received, or returned, the cache and image directories must be updated to reflect the status of that block.

(C.2) Coherency Actions

This section details the actions taken to maintain coherency, by the cache controller 8 using the cache directory 32cd, and by the BIU (34 and 28) using the image directory 32ti. FIGS. 10 and 11 represent the four states of any data block (at a given address) which may reside in the cache data array 12da. Coherency actions taken by the cache controller 8 or BIU (34, 28) change the status of a data block.

Cache Controller Coherency Operations

The "status" of a data block in cache (12da, FIGS. 2, 3A) may change due to PE accesses or BIU commands. Coherency actions caused by each command are detailed next hereunder.

a. SR issued by cache controller due to PE read: When a PE reads a data word and the state in cache is "invalid" (FIGS. 10, 14B) the cache controller 8 issues a Shared Read Command SR (also called a local SR because it was issued by the local PE) to the BIU 28. The "status" in cache directory 32cd, corresponding to the address requested by the PE, is marked "Pending". The marking process consists of writing the tag (for example, if address is FFF00005, then tag is FFF00) into the cache tag array 12ta and writing the PV array 12pv with binary "10" which represents the Pending state. This coherency action is represented in FIG. 10 by the arrow from Invalid to Pending, a status change caused by a local SR (labelled beside the arrow).

b. (Private Read) issued by Cache Controller due to PE write: The PR will not be issued if the data exists as a Valid Master or is Pending. However, if the data exists as "a copy" or does not exist (Invalid) then a PR is issued to the BIU 28. The cache controller 8 marks its cache directory 32cd as Pending, exactly as it does for the SR (depicted by the arrow from Invalid and the arrow from Valid Copy to Pending, labelled "local PR").

Purge Command issued by cache controller due to local SR or PR: If the cache controller 8 finds that it needs to remove a master block in cache 12da, to create space for a block that needs to be marked as Pending, it issues a Purge command. A Purge returns a master block from cache to memory 20. FIG. 10 represents such an action by the arrow from Valid Master (binary 11) to Invalid (binary 00). The Invalid location in the directory 32cd is now used to accommodate the incoming TBS or TBP and is marked Pending.

d. Purge Command issued by cache controller due to external SR: An external SR is an SR (Shared Read) command that comes to the cache controller 8 from the BIU 28 which received the SR from the system bus 24. Such a command, which comes into the cache controller from the system bus via the BIU, is called an external (or remote) command, because it originated in some other PE 10 (as 10a, 10b, 10c, or 10d) An external SR causes the cache controller 8 to return the master block to memory 20, and mark its directory 32cd as Invalid (see arrow in FIG. 10 labelled "Purge due to external SR").

TBP (Transmit Block Private Command) by cache controller due to external PR: An external PR received by the cache controller 8 will cause it to transfer the master block 32cd by issuing a TBP command and marking the cache directory as Invalid (see arrow in FIG. 10 labelled "TBP due to external PR").

f. The INVCOPY Command: The BIU 28 will direct the cache controller 8 to invalidate a specific copy if it determines that a valid copy exists in the cache 12da while another module 6 (6a, 6b, 6c, 6d), 20 (20a, 20b, 20c), is receiving the corresponding master block. Such an invalidation is facilitated by the INVCOPY command issued by the BIU to the cache controller. An INVCOPY command is also generated when a New Data ND command is detected and a valid copy exists in cache.

TBP (Transmit Block Private Command) and TBS (Transmit Block Share Command) from the BIU: The cache controller 8 expects to receive TBS or TBP from the BIU 28 in response to a prior issue of SR or PR to the BIU. When data is transferred to the cache controller 8 from the BIU 28 via a TBP or TBS command, the status of the block in cache 12da is updated from Pending to Valid Copy (for TBS), or from Pending to Valid Master (for TBP) as seen in FIG. 10.

The commands detailed above comprise all the state changes that can occur for any given data block in the cache. Next, a description of coherency operations done by the BIU follows.

(C.4) BIU Coherency Operations

The coherency actions taken by the BIU 28 are based on its snooping function. The BIU performs the following functions when a command is received from the bus 24.

a. Drive the individual bus response on the system bus response lines.

b. Update the image directory 32ti if required.

c. Pass the system bus command, or an INVCOPY command, to the cache controller 8 if required. Since the above actions are triggered only by the commands on the system bus, each command will be detailed separately. The status changes that are done by the BIU, for any given address in the image directory, are shown in FIG. 11.

Local SR or PR: Any BIU can identify "local" commands from "external" ones (issued by other modules) by simply comparing the source ID field of the system bus to its own ID value. When a local SR or PR is identified, the BIU marks its directory as Pending. Note that the transition arrows correspond in FIGS. 10 and 11, and each arrow is denoted with a (1) or (2). A (1) denotes that this particular state change occurs before its counterpart in the other diagram. A (2) denotes that this state change occurs after its counterpart in the other diagram. For example, a state change associated with a local SR or PR occurs first in the cache directory 32cd and afterwards in the image directory 32ti. In fact, the (1) or (2) denotes the natural flow of the command and therefore the sequence of updates as well. This illustrates how the two directories are updated at different times (i.e. non-atomically) in the same PE module 6.

Local Purge and TBP due to external PR: The BIU marks its image directory 32ti "invalid" when a master leaves the module by way of a TBP command or Purge command issued by the local cache controller 8. The arrow from Valid Master to Invalid in FIGS. 10 and 11 depicts the sequence--first the cache controller 8 marks its cache directory 32cd and later, when the command, is on the system bus, the image directory 32ti marked by the BIU 28.

INVCOPY command due to external TBP or ND: If the BIU detects a TBP or ND on the system bus, and also finds a valid copy status in the image directory for the same address, it updates the image directory to change the "valid copy" status to "invalid" and also issues an INVCOPY command to the cache controller 8 which does the same to cache directory 32cd. This ensures coherency rule #3. The sequence numbers show that the image directory 32ti in FIG. 11 does this update before the cache directory 32cd in FIG. 10.

Incoming TBS or TB Commands: Data required by the local cache controller 8 of a given PE module will be transmitted on the system bus 24 as a TBS (Transmit Block Shared) or TBP (Transmit Block Private) command. The BIU 28 of the requesting module will update its image directory as shown in FIG. 11 and then forward the command to the cache controller 8 which marks its own cache directory 32cd. Thus, in FIG. 11 the incoming TBS goes from Pending to Valid Copy Status while incoming TBP goes from Pending to Valid Master.

External SR, PR, ND commands: If the BIU detects a SR, PR, ND on the system bus and also finds the corresponding "Valid Master" status in its image directory it asserts PE-ACK, as outlined in Paragraph B. Then the BIU passes the command to the cache controller 8 which takes appropriate action depending on the command.

For a SR command, the cache controller executes a Purge. Such a Purge performs two functions; it returns the master data block to memory, and also allows the module which issued the SR to make a copy while the Purge is on the system bus 24.

For a PR command, the cache controller executes a TBP, and for an ND the cache controller updates the existing master with the new value and sends back a Result command to the module which issued the ND.

Figure 12A:
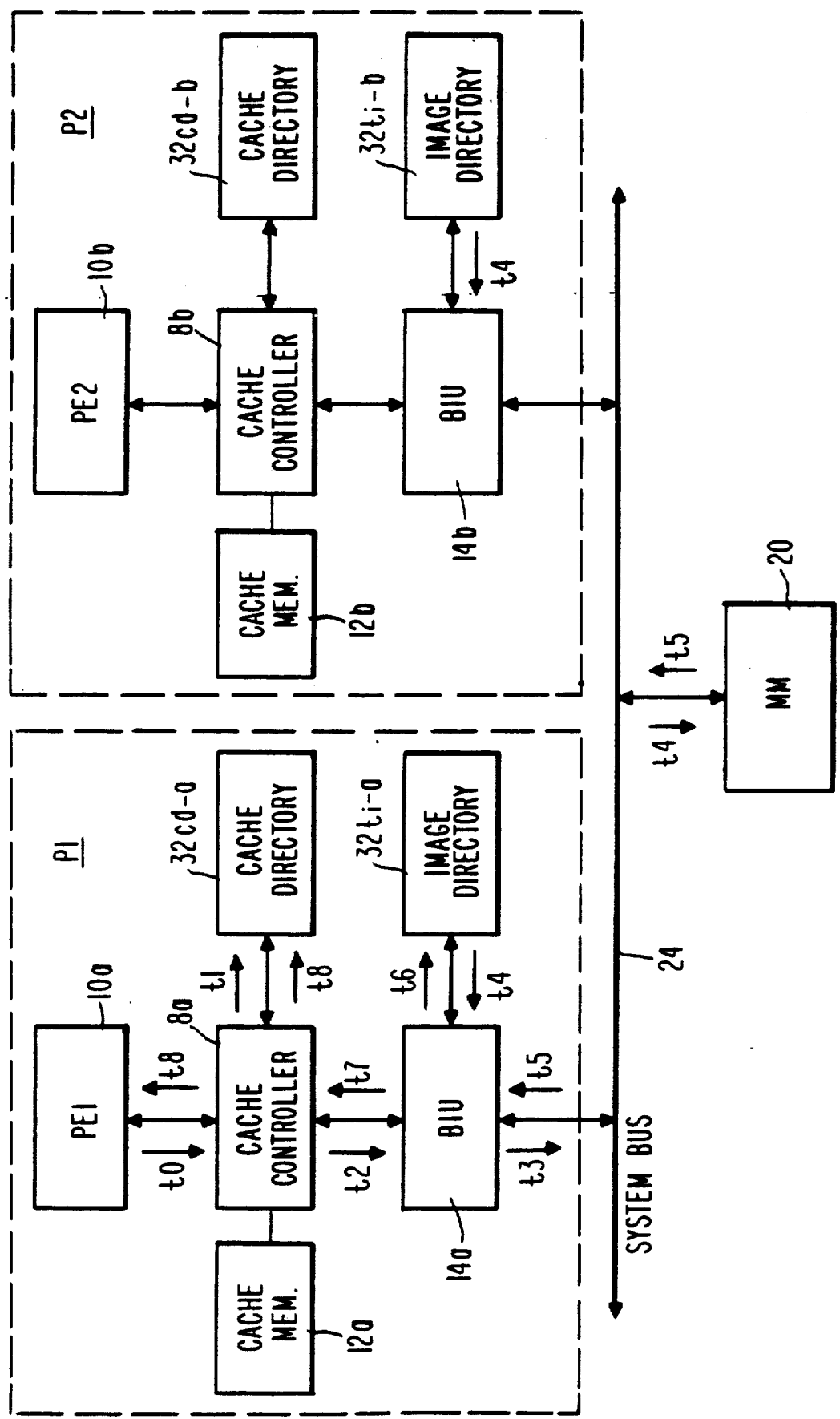

Four examples are shown in FIGS. 12A and B, 13A and B, 14A and B, and 15A and B to illustrate a complete sequence of directory updates. The examples show how coherency is maintained by using duplicated directories (image and cache) which are updated at different times (i.e. non-atomically). Thus, despite the temporary inconsistencies between the directories, the PE's 10 are provided with coherent data. Since the cache directory is "decoupled" from the image directory, the PE-cache speed can be maximized.

In FIGS. 12A, 13A, 14A, and 15A two PE modules P1 and P2, and a memory module MM 20 are shown connected to the system bus 24 which may have other modules as well. Events are defined as actions occurring in a clock period. Clock periods (FIGS. 12B, 13B, 14B, 15B) are identified by t0, t1, t2, etc., where t1 is one or more clocks after t0, t2 is one or more clocks after t1 and so on.

FIGS. 12A, 12B show a system where a master data block, at address FFF00005 for example, is in a MM and no copies exist. At clock t0, PE1 reads the value at FFF00005 and the cache controller finds that the location is invalid. In clock t1 the cache controller writes a Pending status in the cache directory. FIG. 12B illustrates the important events that occur in t2, t3, t4, t5, t6 and t7. Finally in t8 the cache controller receives the data block and passes the requested data word to PE1 and also updates its directory to show Copy status. Note that the updates are done in t6 and t8, i.e. non-atomically. The state of the cache directory is shown in FIGS. 3A and 3B.

Figure 13A:
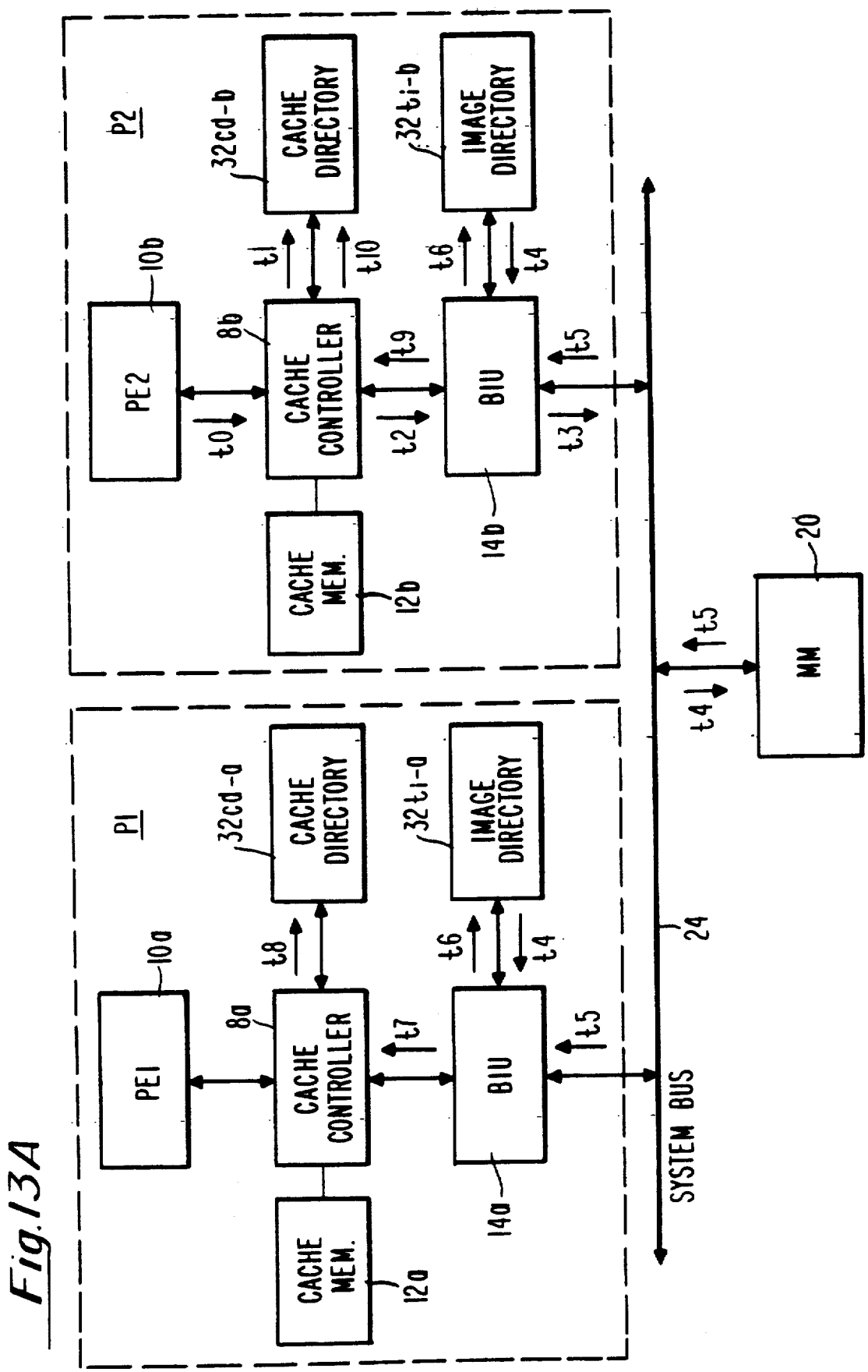

FIGS. 13A, 13B show a subsequent event in the same system where P1 has a copy of the data in cache, at address FFF00005 for example. At t0, PE2 writes at address FFF00005 and the cache controller of P2 finds that it has a status of Invalid for FFF00005. In t1, the cache controller of P2 updates its directory to Pending and in t2 issues a PR to the BIU of P2. In t5 the MM returns the master block, and in t6 all BIUs check their image directories. Both images are updated simultaneously, i.e. atomically. The BIU of P1 finds a copy of the same block in its directory which it invalidates. In t7 the BIU forwards an INVCOPY command to P1 cache controller. Meanwhile the BIU of P2 (in t6) finds the status "Pending" for the block that the MM sent, and so it receives the data block. In t8, P1 "invalidates" the status of the copy in its cache and in t10, P2 writes the "master" status into its cache directory. This example illustrates how coherency is maintained even though the directory updates of P1 are non-atomic; cache of P1 is updated in t8 and cache of P2 in t10.

Figure 14A:
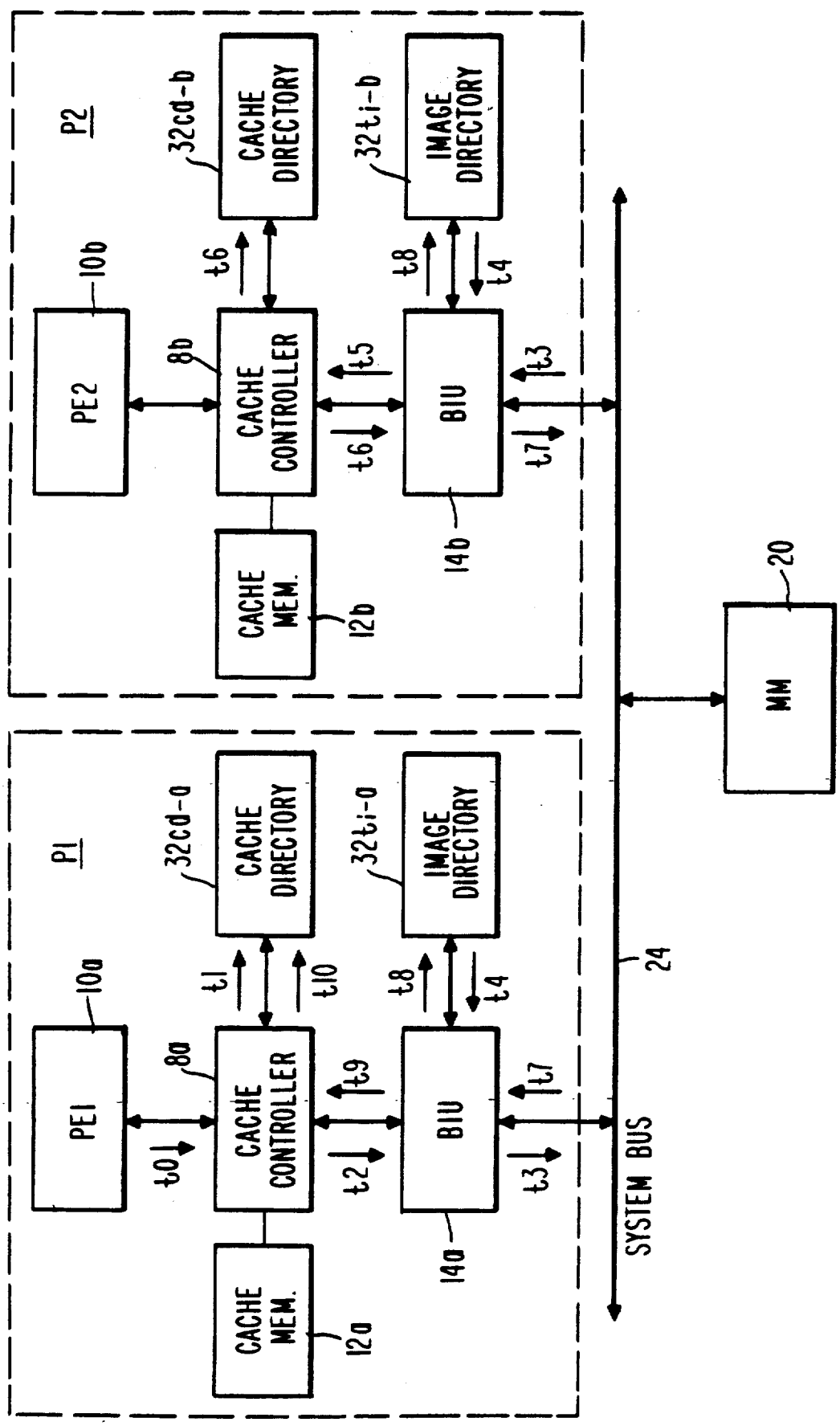
Figure 15A:
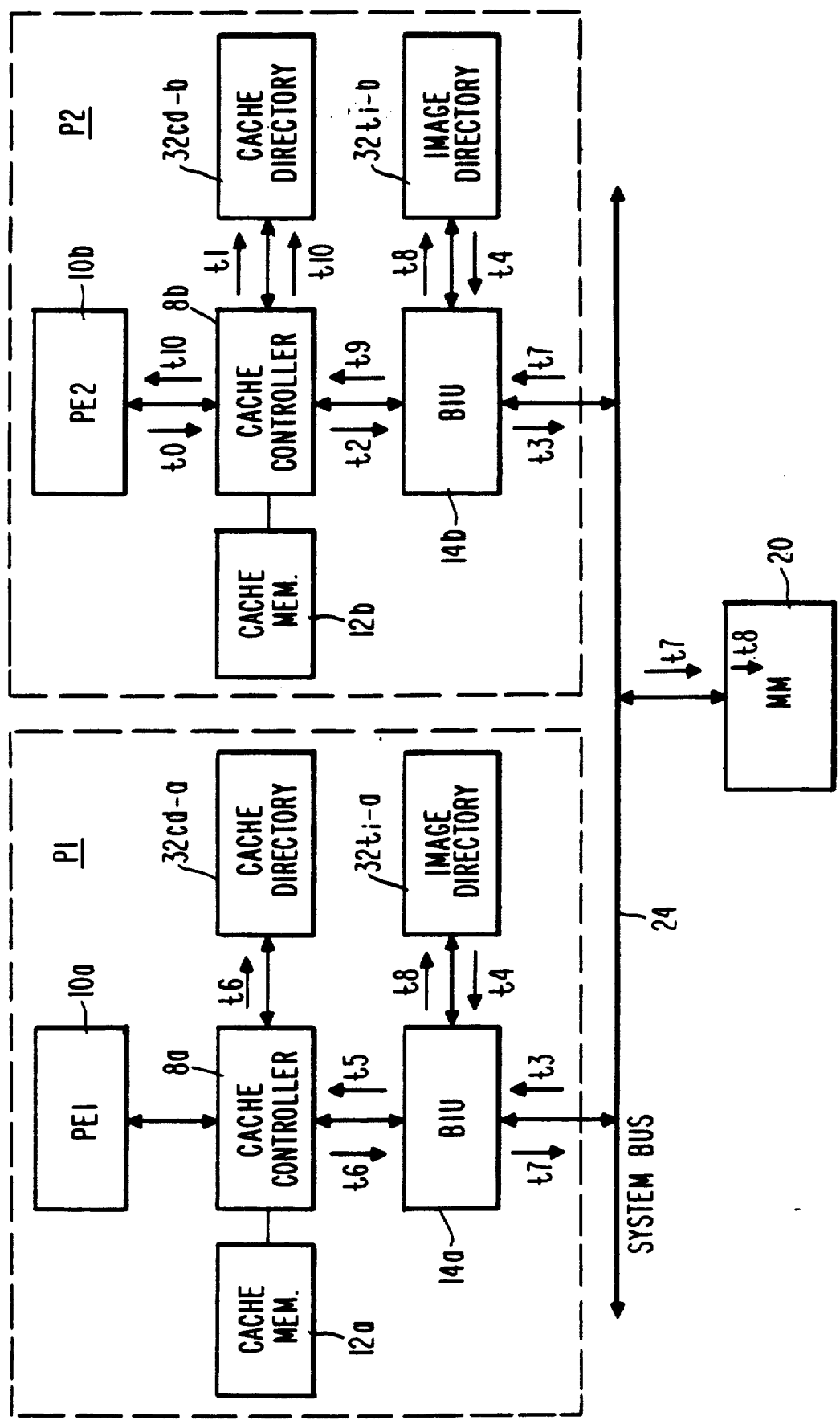

FIGS. 14A, 14B show the transfer of a master block, for example, at address FFF00005, from P2 to P1. MM does not get involved because, in t4, P1 checks its image directory, finds the corresponding master and asserts PE-ACK. Thus MM knows that it must ignore this PR command. FIGS. 15A, 15B show the case where a master block in P1 is returned to memory via a Purge command, caused by a SR command issued by P2.

GLOSSARY

Atomic: Events are termed atomic when they occur simultaneously, or one after the other "without interruption".

Bus Protocol: A set of rules and command functions that determine data transfer and data coherency across the multiprocessor system.

Block: A data block is defined as a set of four words whose addresses differ only in the least two address bits (A0,A1).

Copy: A block of data classified as a copy allows the PE containing that copy to read any word in the block. No writes are permitted. Copies are made from the master primarily by MM's.

Copy-back Cache: A copy-back cache allows PE writes to be copied back to memory sometime after the write is done, rather than immediately.

Directory: A look-up table which shows the existence and status of a data block, i.e. cache directory, image directory.

Image Array: Also called image directory, is an exact copy of the cache directory, but subject to time lag.

Invalid: Designates that the data does not exist in cache memory.

Master: A block of data when classified as a master gives the PE containing that master in its cache the right to modify it.

MM: Main memory module.

Non-Atomic: Two events are non-atomic if other events can occur between them. See Atomic.

PE: Processor Element.

Pending: Designates that a location in cache memory is reserved for a requested block of data.

Request Command: A system bus command which is used to obtain (request) information such as memory data.

Return Command: A system bus command which is used to transfer information, such as memory data, back to the requesting module in response to a request command.

Snooping: The process of using the address specified in the bus command to read the image directory to find out whether a matching address exists in the image, and if so, what the status of the block is.

There has been described herein a multiprocessor network where each processor has its own private cache means and bus interface means which connect to a common system bus to permit intercommunication between the processors and a main memory means. Each processor has its own cache directory and image directory which duplicate each other non-atomically so that the image directory can provide information as to the availability and status of requested data blocks while leaving the cache directory uninhibited for immediate access by a requesting processor, thus providing rapid data access from cache to the requesting processor without unnecessary delays.

Although the disclosure indicates the preferred implementation, other embodiments of this invention may be possible, but which are encompassed by the following claims.

What is claimed is:

1. In a multiple processor network where each processor has its own private cache means and private interface means connected to a main memory means via a common system bus, which carries commands from said processors, a method for ensuring minimal processor-cache access time and guaranteeing that any data accessed from main memory and/or a private cache means by any processor, is up-to-date and currently coherent, said method comprising the steps of:

(a) maintaining a cache directory in said cache means to indicate the presence of an addressed block of data in said cache means and its status condition as to whether the said block of data is currently valid and unable or invalid and not usable;

(b) enabling any one of said processors to access blocks of data from said main memory means or from the said cache means of its own private cache means of from the private cache means of another processor;

(c) establishing a private image directory for each processor which non-atomically updates validity status information in said cache directory;

(d) monitoring said common system bus to sense any updated changes in data blocks in said cache means or said main memory means which were written into by any processor;

(d1) evaluating the collective response of receivers to a command on said system bus to determine which receiver should accept the command;

(d2) updating the image directories of each said cache means;

(d3) updating the validity status information in each cache directory;

(e) comparing and checking the status in the said cache directory and image directory of a data block, requested by a processor, via said system bus, to verify its current validity before enabling said data cache means for data access by a requesting processor.

2. A system for ensuring coherency of accessed data for each processor in a multiprocessor network and for minimizing processor-cache access time, where each processor has its individual private cache unit means and individual private bus interface means connected to a common system bus which provides communication to a main memory means, the combination comprising:

(a) main memory storage means for storing data usable by each of a plurality of processors in a network;

(b) a system bus connecting said main memory storage means to each of said processors via a private bus interface unit for each of said processors;

(c) bus interface means, which includes a plurality of private bus interface units for servicing each processor, and wherein each said private bus interface unit connects to said system bus; and includes:

(c1) an image directory for storing the validity information status of each data block in its private cache unit means as updated by a hardwired protocol means;

(c2) said hardwired protocol means for sensing all data-changing operations on said system bus and setting updated validity status information into said image directory; said protocol means including:

(c2a) means for transmitting commands which cause the said image and cache directories to duplicate each other non-atomically;

(d) cache means, including a private cache unit means for each processor, for providing direct uninterrupted data access to each requesting processor and ensuring the integrity of the data access ed, said private cache unit means including:
- (d1) a cache directory for storing information regarding the present existence of, and information as to the validity status of, an addressed block of data in said private cache units means;
- (d2) cache controller means for implementing said hardwired protocol means for non-atomically updating the information in said cache directory from information in said image directory;
- (e) processor means, including a plurality of local processors wherein each local processor has its own private cache unit means and its own private bus interface unit.

3. The combination of claim 2 wherein each of said private cache unit means includes:
- (a) a cache data array memory for storing data blocks, from said main memory means;
- (b) a tag array memory for indicating whether an addressed data block presently resides in said data array memory;
- (c) a private valid (PV) array memory for storing the validity status condition of each data block in said cache data array memory;
- (d) said cache controller means for also executing commands from said processors and for managing data transfers;
- (e) wherein each of said memory arrays is implemented with single-ported RAM memories.

4. The combination of claim 3 wherein each of said private bus interface units includes:
- (a) an image tag array memory for storing tag data indicating the presence of an address block in said cache data array memory;
- (b) an image private valid (PV) array memory for indicating the validity status condition of each data block in said cache data array memory.

5. The combination of claim 3 wherein said tag array memory and said private valid (PV) memory constitute said cache directory which indicates the status of each data block residing in said cache data array memory.

6. The combination of claim 4 wherein said image tag array memory and said image private valid (PV) array memory constitute said image directory which indicates the status of each data block residing in said cache data array memory.

7. The combination of claim 3 wherein the validity status of a requested data block in said cache data array memory can be ascertained by a remote processor from said image directory without inhibiting the local processor from accessing an addressed data block in its cache data array memory.

8. A system for ensuring coherency of data in a multiprocessor network and for minimizing processor-cache access time where each local processor has its local private cache means and local private bus interface means connected to a common system bus which provides communication to a main memory means, the combination comprising:
- (a) processor means for reading data from said main memory means and writing data into said main memory means;
- (b) cache means, connected to said processor means, for storing data for direct uninterrupted access to said processor means and including a first directory means reflective of the current validity status of data in said cache means to be accessed by said local processor means;
- (c) interface means, connected to said cache means, for enabling said cache means to transmit or receive data to/from said system bus and including a second directory means reflective of the most current validity status of any data moved on said system bus, said interface means further including:
  - (c1) bus interface means for monitoring data moved on said system bus and for sensing via a hardware implemented protocol any modification of said moved data for storage of validity status information in said second directory means;
  - (c2) controller means for updating, via non-concurrent clock cycles, the associated mirror-image data validity status information in said first directory means;
- (d) and wherein said interface means cooperates with said cache means to implement said hardwired protocol as a snooping coherency protocol which updates said first and second directory means to a concurrently valid status condition via non-concurrent (non-atomic) clock cycles;
- (e) said system bus for enabling communication between said processor means, said cache means, said interface means and said main memory means;
- (f) said main memory means, connected to said system bus, for storing data usable by said processor means, and including:
  - (f1) queueing means for storing data requests to said main memory means by a requesting processor and for storing data to be returned to a requesting processor.

9. In a multiple processor system where each local processor has its own private cache means and its own private interface means connected to a common system bus means which permits communication with a queueing main memory means, the combination comprising:
- (a) cache means connected to each local processor, said cache means including:
  - (a1) a cache data array memory means for storing blocks of data words read from said main memory means or to be written into said main memory means;
  - (a2) a cache directory means which includes:
    - (a2a) a tag array memory for storing tag data indicating whether an addressed data block is presently residing in the cache data array memory means;
    - (a2b) a private valid (PV) array memory for storing the validity status condition of each data block in said cache data array memory means;
  - (a3) a cache controller means for executing commands from its associated local processor and for managing data transfers between said processor, said cache data array memory means, said cache directory means, and a bus interface unit means;
- (b) said bus interface unit means connected to said cache controller means and said cache directory means for transmitting to, or receiving commands and data from, said system bus, said bus interface unit means including:
  - (b1) an image directory means for duplicating information in said cache directory means, said image directory means including:
    - (b1a) an image tag array memory for storing tag data as to whether an address block is presently residing in said cache data array memory means;

(b1b) an image private valid (PV) array memory for storing the validity status condition of each data block in said cache data array memory means;

(b1c) means to monitor (snoop) the data on said system bus means so as to non-atomically update said cache and image directory means in order to make them reflect the same validity status for a given block of data words.

(c) said system bus means for connecting to each bus interface unit of each processor and for connecting to said main memory means;

(d) said queueing main memory means, connected to said system bus means, for storing of data and requests that were generated by requesting processors.

10. A system for directly & concurrently informing a local processor and a remote processor of the presence of, and validity of, data residing in a private cache unit os a local processor in a multiprocessor system connected by a system bus, said system comprising:

(a) a plurality of local processor modules, each said local processor module including:

(a1) a local processor means;

(a2) a private local cache memory unit associated with said local processor means;

(a3) a private local cache directory providing direct uninterrupted access to said local processor means to signal validity/invalidity and presence of specifically addressed data within said private local cache memory unit;

(a4) a private local image directory providing direct, uninterrupted access for a remote (non-local) processor, via said system bus, to said image directory to signal validity/invalidity and presence of specifically addressed data within a private local cache memory unit;

(a5) a private local cache controller for receiving and responding to local processor means commands and cooperating with a private local bus interface unit means to provide a hardwired coherency protocol to non-atomically update said cache directory and image directory so that they duplicate each other;

(a6) said private local bus interface means corrected to said system bus to receive data and commands from remote processor means and including;

(a6a) means to monitor (snoop) on said system bus to detect changes in data status and cause updating at validity/invalidity information in said image directory and cache directory;

(b) a plurality of main memory module means connected to said system bus.

11. The system of claim 10 wherein said main memory module means including:

(a1) input queue means for holding command requests; and (a2) output queue means for holding data accessed from main memory for subsequent transmittal on said system bus.

* * * * *